(12) United States Patent
Hamelin et al.

(10) Patent No.: US 11,465,744 B2
(45) Date of Patent: Oct. 11, 2022

(54) AERONAUTICAL CONVEYING AND RELEASE DEVICE

(71) Applicant: ALKAN, Valenton (FR)

(72) Inventors: Arnaud Hamelin, Valenton (FR); Victor Blondel, Valenton (FR)

(73) Assignee: ALKAN, Valenton (FR)

( * ) Notice: Subject to any disclaimer, the term of this patent is extended or adjusted under 35 U.S.C. 154(b) by 60 days.

(21) Appl. No.: 17/166,040

(22) Filed: Feb. 3, 2021

(65) Prior Publication Data

US 2021/0237886 A1 Aug. 5, 2021

(30) Foreign Application Priority Data

Feb. 3, 2020 (FR) ........................................ 2001056

(51) Int. Cl.
*B64D 1/06* (2006.01)
*B64D 1/12* (2006.01)
(52) U.S. Cl.
CPC ....... *B64D 1/06* (2013.01); *B64D 1/12* (2013.01)
(58) Field of Classification Search
CPC ... B64D 1/02; B64D 1/04; B64D 1/06; B64D 7/08
See application file for complete search history.

(56) References Cited

U.S. PATENT DOCUMENTS 2,362,210 A * 11/1944 Markey ............... B64D 1/04
89/1.51
2,416,028 A * 2/1947 Sloan .................. B64D 1/04
89/1.51

(Continued)

FOREIGN PATENT DOCUMENTS

| FR | 2 403 933 | 9/1978 | |
|---|---|---|---|
| FR | 2 443 973 | 12/1978 | |
| GB | 2 005 812 A | 9/1978 | |
| GB | 2005812 A * | 4/1979 | ............... B64D 7/08 |

OTHER PUBLICATIONS

Rapport De Recherche Prélininaire issued in corresponding French Patent Application. No. 881815 dated Dec. 14, 2020.

(Continued)

*Primary Examiner* — Joshua J Michener
*Assistant Examiner* — Ryan Andrew Yankey
(74) *Attorney, Agent, or Firm* — Troutman Pepper Hamilton Sanders LLP

(57) ABSTRACT

Aeronautical conveying and release device comprising a frame, an actuator releasing a device, a first and second hook holding the device, first and second locking toggles having a locking and unlocking position, first and second cams in contact with the first or second toggle in a first direction, movement of the first or second cam in a second direction causing the toggle to leave the locking position and the unlocking of the hook, a third cam actuated from and returns to an idle position, a fourth cam driven by the third cam into unlocking, the third cam unlocking the first cam, a fifth cam coupled to the first cam, a safety member with lever with a first position which blocks the unlocked cams, the first cam and the second cam being blocked unlocked, blocking the locked toggles, a second position where the lever is blocked by the fourth and/or the fifth cam, and a third position where the lever frees the cams.

10 Claims, 21 Drawing Sheets

(56) References Cited

U.S. PATENT DOCUMENTS

| | | | | |
|---|---|---|---|---|
| 2,473,597 A | * | 6/1949 | Leland .................... | B64D 1/04 89/1.51 |
| 2,756,091 A | * | 7/1956 | Komerska ................ | B64D 1/04 294/82.26 |
| 4,313,582 A | | 2/1982 | Hasquenoph et al. | |

OTHER PUBLICATIONS

Opinion Écrite Sur La Brevetabilite De L'Invention issued in corresponding French Patent Application No. 2001056 dated Feb. 4, 2020.

* cited by examiner

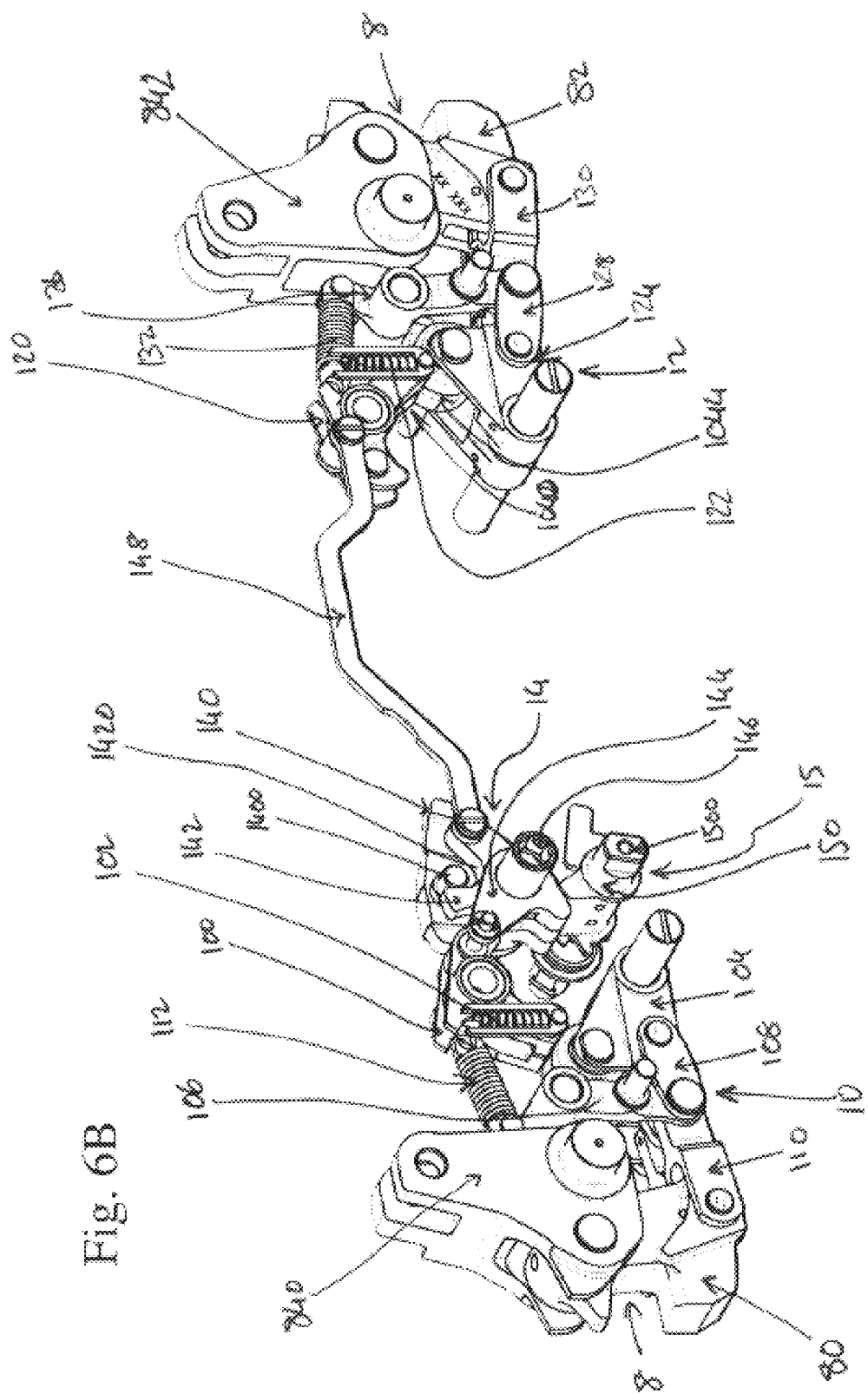

AERONAUTICAL CONVEYING AND RELEASE DEVICE

CROSS REFERENCE TO RELATED APPLICATION

The present application claims priority of French Patent Application No. 2001056 filed Feb. 3, 2020. The entire contents of which are hereby incorporated by reference.

FIELD OF THE INVENTION

The invention relates to the field of aeronautical conveying and release devices, especially ejectors, and in particular pyrotechnic or pneumatic ejectors, and triggers. Ejectors are conveying and release devices for aircraft that are able alternately to hold and release a device on command, also known by the term payload. Ejectors are intended to be mounted on fixed-wing or rotary aircraft, typically armed airplanes, helicopters or drones.

BACKGROUND

An ejector is typically installed at the bottom part of an aircraft, for example under a fuselage or under a wing. The ejector receives a device, which it holds in flight. On reception of a separation command, the ejector releases the device, and then pushes it at a distance from the aircraft, in general vertically.

The known ejectors are however heavy. The safety procedures, training, maintenance time, recharging time and safety generate costs, human errors and risks for the mission of the aircraft and, in certain cases, the maintenance operators.

Furthermore, the operation of the known ejectors necessarily comprises a manual safety procedure using a safety pin, manipulated by an operator at the end of the runway. The safety pin is removed immediately before takeoff, and returned at the end of the mission if the device has not been released. The operator is subjected to bad weather and runway hazards. The pin may be lost on the runway, putting other aircraft in danger. Furthermore, forgetting to remove the pin before takeoff compromises the mission. The human factor is crucial. There is a need relating to on-board safety on ejectors, independent of the human factor and not putting in danger the other aircraft and the successful accomplishment of the missions.

SUMMARY

The invention improves the situation.

The invention aims to reduce the risks caused and incurred by human beings in the flight preparation and return.

For these purposes, the invention proposes an aeronautical conveying and release device for a device to be released, comprising at least
 a frame,
 an actuator for the release of the device,
 a hook assembly comprising a first hook and a second hook, able to hold the device to be released,
 a first locking toggle and a second locking toggle substantially similar and disposed symmetrically in the frame between the first and second hooks, each of the first and second toggles having
   a locking position wherein said first or second toggle locks said first or second hook, and an unlocking position wherein said first or second toggle causes the unlocking of said first or second hook,
   a first cam and a second cam, each rotatably mounted in the frame and maintained in contact with the first or second toggle in a first direction by an elastic return member,
 a movement of the first or second cam counter to said elastic member in a second direction opposite to the first direction causing the first or second toggle to leave the locking position and causing the unlocking of the first or second hook,
   an unlocking assembly, comprising a third cam, a fourth cam and a fifth cam, rotatably mounted in the frame on an axis, wherein
 the third cam is actuated by the actuator from an idle position, with return to the idle position,
 the fourth cam is rotated by the third cam in the unblocking direction, and drives the second cam in the unblocking direction by a longitudinally rigid member,
 the third cam drives the first cam by contact in the unblocking direction, the fifth cam is coupled to the first cam,
   a safety member comprising a safety lever that can be in a first SAFE position wherein the safety lever rotationally blocks the third, fourth and fifth cams in the unblocking direction, whereby the first cam and the second cam are rotationally blocked in the unlocking direction, thereby blocking the first toggle and the second toggle in the locking position,
 a second GRD position wherein the safety lever is rotationally blocked by at least one of the fourth and fifth cams at a distance from said SAFE position, and
 a third ARMED position wherein the safety lever leaves the third, fourth and fifth cams free.

The invention makes it possible to lock the release device as soon as a device is installed until the separation command.

The two toggles and the hook assembly are unlocked by means of a single unlocking assembly. The ejector is compact. Both the loading and the ejection of a device is easier, thanks to the safety lever that controls the triggering. More generally, the ergonomics of the ejector is simplified. Reliability is also improved. The device has no removable part. A first position of the safety lever is equivalent to the presence of a safety pin. The second position of the safety lever is equivalent to the absence or removal of a safety pin. The conveying, release and landing with a device are thus simplified. The risk related to a human error is reduced. The safety of the aircraft is increased.

The device may have one or more of the following aspects:
 the first toggle and the second toggle are disposed on either side of the actuator,
 the first cam and the second cam are disposed between the first toggle and the second toggle, the unlocking assembly is disposed between the first toggle and said actuator, and the longitudinally rigid member passes alongside or above the actuator,
 each toggle comprises at least one return member, and
 a first lever and a second lever, each articulated on the frame, a first swivel, connecting the first lever and the second lever, and
 a second swivel, connecting the second lever and the hook assembly,
 the second lever, the first swivel and the second swivel being articulated together about an axis, the first lever being blocked in the locking position by the first or second cam when the safety lever is in its first position, whereby said toggle is blocked in the locking position, the first lever in the unlocking position blocking the first or the second cam in the unlocking position, the second lever being forced by the return member in the unblocking direction of said toggle the first lever is a toggle lever, the second lever is a relay lever, the first swivel is a toggle swivel and the second swivel is a hook swivel, for the first and for the second toggle, a rotation of the first or second cam releases the rotation of the first lever, this releasing the rotation of the second lever by means of the first swivel, and the return spring rotating the second lever causes the movement of the second swivel towards its unlocking position, which unlocks the first or second hook, the device further comprises an ejection assembly able to push the released device, the ejection assembly comprising a chamber able to store ejection energy, the ejection energy driving the actuator, whereby the third cam is actuated, the actuator comprises a cylinder fluidically connected to the chamber and an unlocking piston, a gas introduced into the cylinder from the chamber pushing the unlocking piston, said unlocking piston pushing the third cam in the unlocking direction, chamber receives one of at least one pyrotechnic cartridge able to produce pressurized gas and a compressed gas for pushing the unlocking piston, the ejection assembly comprises at least one ejection piston fluidically connected to the chamber and able to push the device, and the actuator is fluidically closer to the chamber than the at least one ejection piston, safety lever can be moved manually or by an electromechanical unit activated on command.

BRIEF DESCRIPTION OF THE DRAWINGS

Other features and advantages of the invention will be disclosed in detail in the following description, made with reference to the accompanying drawings, on which:

FIG. 6A and FIG. 6B are perspective views of the kinematic assembly of the ejector of FIG. 1.

DETAILED DESCRIPTION

Figure 1:
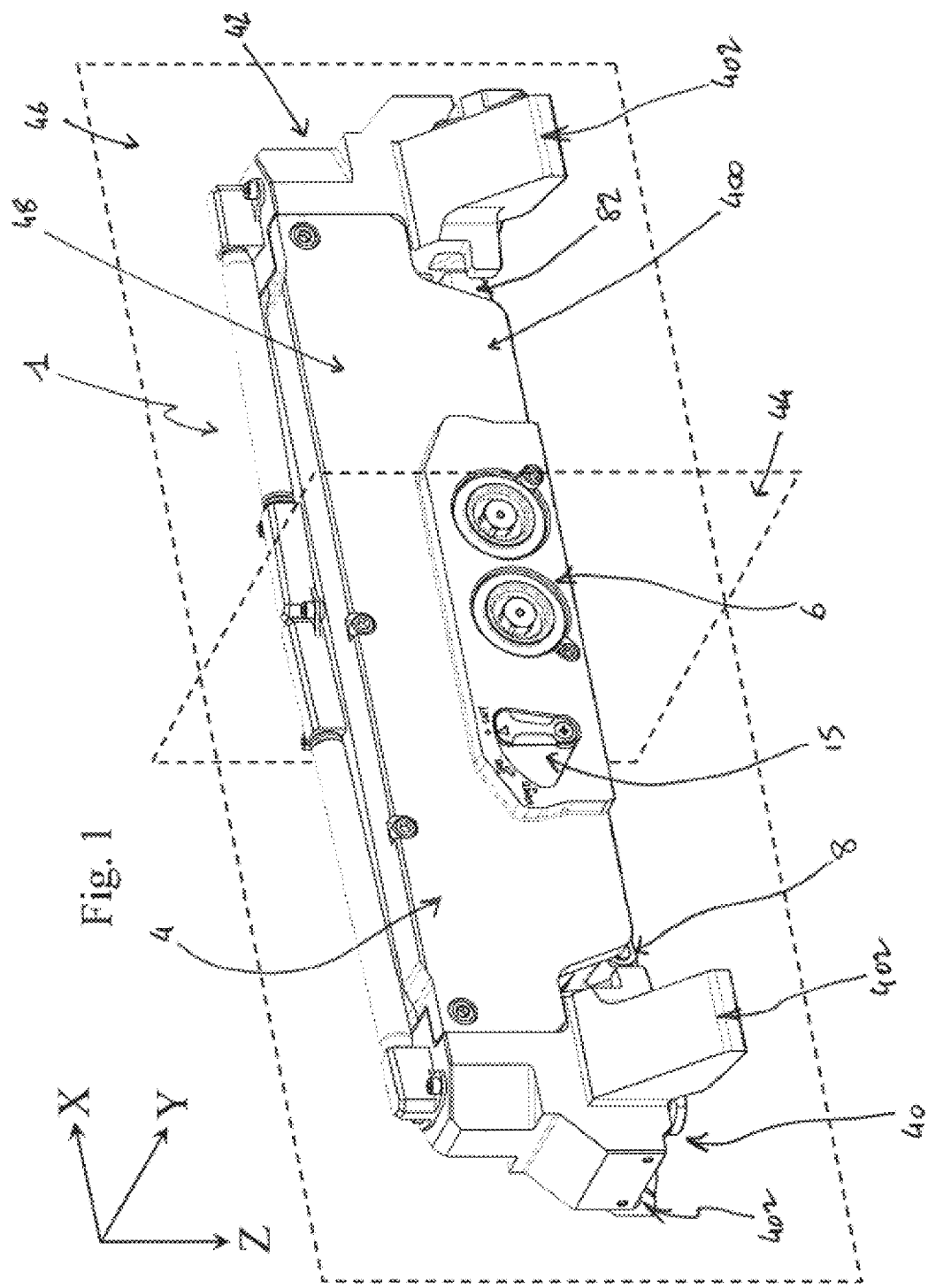
FIG. 1 is a perspective view of an ejector according to one aspect of the invention.

The accompanying drawings contain, essentially, elements of a certain character. They can therefore not only serve to give a better understanding of the present invention, but also contribute to the definition thereof, where applicable.

FIGS. 1 to 7 show an ejector 1 according to one aspect of the invention and the kinematics thereof.

The ejector 1 is intended to be attached to an aircraft, for example a fighter aircraft, and to receive a device 2 to be released, also referred to as the payload. The ejector 1 receives the device 2 during a loading (on the ground) and separates from said device 2 during a release or an ejection (in flight).

The device 2 includes a pair of holding projections 20 on one of the walls thereof, in particular rings. The holding projections 20 may alternatively be in a T shape. The ejector 1 holds the device 2 by coming into engagement with said holding projections 20 when the ejector 1 is loaded. On release, the ejector 1 releases the holding projections 20 from the device 2, and then pushes the device 2 in a thrust direction Z. The device 2 is ejected.

The ejector 1 extends along a direction X perpendicular to the thrust direction Z, from a front end 40 to a rear end 42. The ejector 1 is roughly symmetrical with respect to a first plane 44 orthogonal to the direction X.

In the embodiment described here, the ejector 1 has an elongate appearance along the direction X. Here, the ejector 1 is furthermore generally symmetrical with respect to a second plane 46 parallel to the directions X and Z.

The ejector 1 has two lateral faces 48 and 50 opposed in a direction Y orthogonal to the plane (X, Z). On the figures, the direction Z is oriented downwards. Here, the ejector 1 has a roughly planar appearance with respect to the direction Y.

The ejector 1 furthermore has a bottom face 52, perpendicular to the direction Z. The device 2 received by the ejector 1 is facing the bottom face 52. The holding projections 20 are disposed in proximity to the ends 40 and 42.

The ejector 1 comprises a frame 4. The frame 4 comprises two parallel longitudinal members 400 disposed at a distance from one another in the direction Y. Each of the two longitudinal members 400 forms one of the two lateral faces 48 and 50.

The frame 4 further comprises a plurality of lugs 402 (here four). The lugs 402 are arranged at the bottom part of the frame 4. The lugs 402 are intended to come into abutment against the device 2, when the latter is received by the ejector 1. The lugs 402 improve the stability of the device 2 held by the ejector 1.

The longitudinal members 400 define between them a housing 4000. The ejector 1 comprises, housed in the housing 4000, an ejection assembly 6, a hook assembly 8, a first locking toggle 10, a second locking toggle 12, a first cam 100, a second cam 120, an unlocking assembly 14 and a safety member 15.

The ejection assembly 6 comprises a body 60, a pair of ejection pistons 64 and an unlocking piston 66. The ejection pistons 64 are oriented in the direction Z, downwards in the figures.

The body 60 is disposed towards the center of the ejector 1. The body 60 defines a chamber 62. The chamber 62 is able to store ejection energy, in particular in order to drive the unlocking pistons 66. The chamber 62 comprises two housings 620 able each to receive a pyrotechnic cartridge (not shown in the figures). Here, each of the housings 620 is a cylinder formed by the body 60 and extending axially in the direction Y.

The pyrotechnic cartridges, once actuated, release a pressurized gas. The pressurized gas pushes the ejection pistons 64 downwards, whereby the latter push the device 2.

The unlocking piston 66 is housed in a cylinder formed in the body 60. The unlocking piston 66 and the cylinder form at least partly an actuator for releasing the device 2. The unlocking piston 66 is disposed in proximity to the chamber 62, for example on the same side as the front end 40. When the pyrotechnic cartridges are actuated, the pressurized gas pushes the unlocking piston 66 partly out of the body 60. The unlocking piston 66 causes the release of the device 2 by the hook assembly 8, by means of the first toggle 10, the second toggle 12 and the unlocking assembly 14.

In the embodiment described here, the ejection pistons 64 are arranged respectively in proximity to the front end 40 and the rear end 42 of the ejector 1.

At the time of a release, the ejection assembly 6 pushes the device 2 by means of the ejection pistons 64, whereby the ejection assembly 6 transmits ejection kinetic energy to the device 2.

The ejection pistons 64 and the cylinder formed in the body 60 are fluidically connected to the chamber 62. Here the cylinder is disposed fluidically closer to the chamber 62 on the ejection pistons 64. The pressurized gas coming from the chamber thus arrives more quickly in the cylinder than at the ejection pistons 64. On release, the unlocking piston 66 housed in the cylinder actuates the release of the device 2 before the ejection pistons 64 push said device 2. This makes it possible to avoid pushing the device 2 before release thereof. The release is more effective. Furthermore, as the pressurized gas source actuating the unlocking piston 66 and the ejection pistons 64 is common, the ejection assembly 6 is reliable and of simple structure.

In a variant, the ejector 1 is a pneumatic ejector. The chamber 62 then stores a compressed gas actuating on command the unlocking piston 66 and the ejection pistons 64.

The hook assembly 8 is a mechanism arranged in order alternately to hold and release the device 2. The hook assembly 8 has a first state in which the hook assembly 8 is closed and holds the device 2. The hook assembly 8 has a second state wherein the hook assembly 8 is open and releases the device 2. The hook assembly 8 is able to move between these two states.

The hook assembly 8 comprises here a first hook 80 and a second hook 82. The first hook 80 is arranged in proximity to the front end 40. The second hook 82 is arranged in proximity to the rear end 42.

Each of the hooks 80 and 82 is designed to come into engagement with one of the holding projections 20. When the hook assembly 8 is in its first state, each hook 80, 82 is in a closed position in which the hook 80, 82 holds the respective holding projection 20 of the device. The hooks 80 and 82 are locked. When the hook assembly 8 is in its second state, each hook 80, 82 is in an open position wherein the hook 80,82 releases the respective holding projection 20 of the device. The hooks 80 and 82 are unlocked.

Each of the toggles 10, 12 is a mechanism able to move between two stable positions. The two positions have different energies. One of the positions is the locking position of the toggle 10, 12. The other one of the positions is the unlocking position of the toggle 10, 12. The energy of the locking position is higher than the energy of the unlocking position.

The first locking toggle 10 and the second locking toggle 12 lock or unlock alternately the hook assembly 8. The toggles 10 and 12 in their locking position keep the hook assembly 8 closed. The toggles 10 and 12 in their unlocking position keep the hook assembly 8 open.

The toggles 10 and 12 are substantially similar. The toggles 10 and 12 are here disposed symmetrically in the frame 4 between the two hooks 80 and 82, on either side of the unlocking piston 66. The first toggle 10 is disposed between the unlocking piston 66 and the first hook 80. The second toggle 12 is disposed between the unlocking piston 66 and the second hook 82. The toggles 10 and 12 are roughly planar. The toggles 10 and 12 comprise a plurality of organs rotatably mounted about the direction Y.

The hook assembly 8 can act on the toggles 10 and 12 when said toggles 10 and 12 are not blocked in their respective locking or unlocking positions. When the ejector 1 receives the device 2, a force is applied by the holding projections 20 on the hooks 80 and 82, causing each of the toggles 10 and 12 to tilt from its unlocking position to its locking position.

The first cam 100 and the second cam 120 are rotatably mounted about axes in the direction Y in the frame 4 between the toggles 10 and 12. The first cam 100 is in proximity to the first toggle 10. The second cam 120 is in proximity to the second toggle 12.

The first cam 100 has a locking position in which said first cam 100 blocks the first toggle 10 in the locking position. The second cam 120 has a locking position in which said second cam 120 blocks the second toggle 10 in the locking position.

The first cam 100 has an unlocking position in which said first cam 100 leaves the first toggle 10 free to leave its locking position. The second cam 120 has an unlocking position in which said second cam 120 leaves the second toggle 12 free to leave its locking position.

The first cam 100 is forced towards its locking position by a first elastic return member 102. The second cam 120 is forced towards its locking position by a second elastic return member 122. The elastic return members 102 and 122 hold the first and second cams 100 and 120 against the first and second toggles 10 and 12 respectively. Here the elastic return members 102 and 122 are linear springs.

The first elastic return member 102 forces the first cam 100 in a first direction. The second elastic return member 122 forces the second cam 100 in a first direction. The first direction of the first cam 100 is opposite to the first direction of the second cam 120. In the embodiment described here, the first direction of the first cam 100 is the anticlockwise rotation direction when the ejector 1 is seen from the right, as in FIG. 3.

When the first cam 100 and the second cam 120 are caused to pivot counter to their respective elastic members 102 and 122 in a second direction opposite to the first direction, the first cam 100 and the second cam 120 drive the first toggle 10 and the second toggle towards their unlocking positions. The toggles 10 and 12 cause the unlocking of the hooks 80 and 82. The hook assembly 10 tilts into the open state. The device 2 is released.

Each toggle 10, 12 comprises a first lever 104, 124, a second lever 106, 126, a first swivel 108, 128, a second swivel 110, 130 and a return spring 112, 132 respectively.

The first lever 104, 124 is a toggle lever. The second lever 106, 126 is a relay lever. The first swivel 108, 128 is a toggle swivel. The second swivel 110, 130 is a hook swivel.

The levers and swivels of the toggles 10, 12 have a roughly planar shape and are rotatably mounted about axes in the direction Y. Each lever and each swivel is able to move between a locking position and an unlocking position in which its respective toggle 10, 12 is respectively in the locking position and in the unlocking position.

The toggles 10 and 12 being similar, the following description of the first toggle 10 and of the first cam 100 applies to the second toggle 12 and to the second cam 120.

The first lever 104 and the second lever 106 are rotatably mounted on the frame 4. The first swivel 108 is articulated with the first lever 104 and with the second lever 106. The first swivel 108 connects the first lever 104 and the second lever 106. The second swivel 110 is articulated with the first hook 80. The second swivel 110 connects the first hook 80 and the second lever 106.

The second lever 106, the first swivel 108 and the second swivel 110 are articulated together about a toggle axis 114 in the direction Y. The articulation of the second lever 106, of the first swivel 108 and of the second swivel 110 about the same axis improves the compactness of the toggle assembly 10.

The first lever 104 and the first cam 100 are disposed in proximity to each other. When the first cam 100 is in the locking position, the first lever 104 is blocked in the locking position by the first cam 100 until the first cam 100 leaves its locking position (typically through the projecting movement of the unlocking piston 66). In the unlocking position, the first lever 104 blocks the first cam 100 in the unlocking position, until the first lever 104 leaves its unlocking position (typically when a force is applied during a loading of the device 2).

Thus the first cam 100 in the locking position blocks the first toggle 10 in the locking position, and the first toggle 10 in the unlocking position blocks (by means of the first lever 104) the first cam 100 in the unlocking position.

The first lever 104 here has a roughly triangular shape. The first lever 104 is articulated about an axis in the direction Y with the second lever 106 about an axis disposed at a first vertex of the triangle. The first lever 104 is rotatably mounted in the frame 4 about an axis in the direction Y about an axis disposed at a second vertex of the triangle.

Here the triangle is substantially a right-angled triangle and the first vertex of the triangle is a right angle. The second vertex of the triangle is here the vertex closest to the unlocking piston 66 in the direction X.

The first lever 104 here comprises, at the third vertex of the triangle, a finger 1040 projecting in the direction Y, towards the left. The finger 1040 of the first lever 104 comes into engagement with a groove 1042 in an arc of a circle formed in the frame 4. The engagement of the finger 1040 of the first lever 104 with the groove 1042 in an arc of a circle can be visible from the outside and can make it possible to come into contact with a relay signaling the hook-open state.

Here, the first lever 104 comprises a roller 1044 at the third vertex of the triangle. The roller 1044 comes into abutment with the first cam 100 when the first lever 104 and the first cam 100 block each other mutually.

The return spring 112 tends to cause the first toggle 10 to tilt into the unlocking position, said first toggle 10 being able to be held by the first cam 100. The return spring 112 is here linear. The return spring 112 is articulated at one of the ends thereof with the frame 4, and at the other of the ends thereof with one end of the second lever 106. The return spring 112 forces the second lever 106 to move from its locking position to its unlocking position, that is to say in the unblocking direction of the first toggle 10.

Thus, when the first cam 100 leaves the first toggle 10 free to leave its locking position, the return spring 112 drives the second lever 106 out of its locking position. The second lever 106 in its turn drives the first swivel 108 and the second swivel 110 towards their respectively unlocking positions. The first swivel 108 drives the first lever 104 into the unlocking position. The second lever 110 opens the first hook 80.

The second lever 106 is in a roughly V shape, here with an obtuse angle. The second lever 106 comprises two ends 1060 and 1062 and a top 1064. The second lever 106 is articulated with the frame 4 at its top 1064, with the return spring 112 at one of the ends 1060, and with the first swivel 108 and the second swivel 110 at the other end 1062.

Figure 6A:
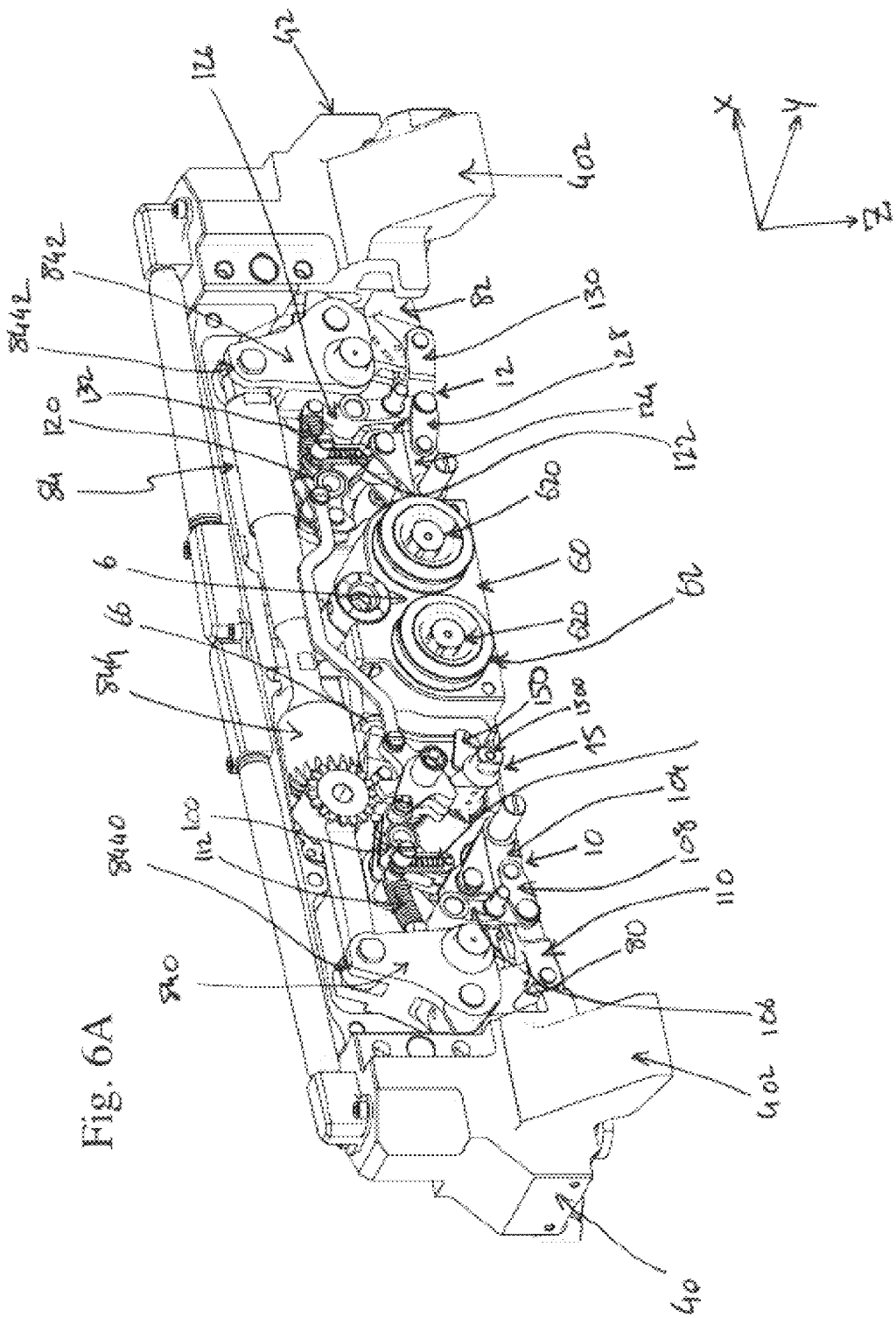
Figure 7:
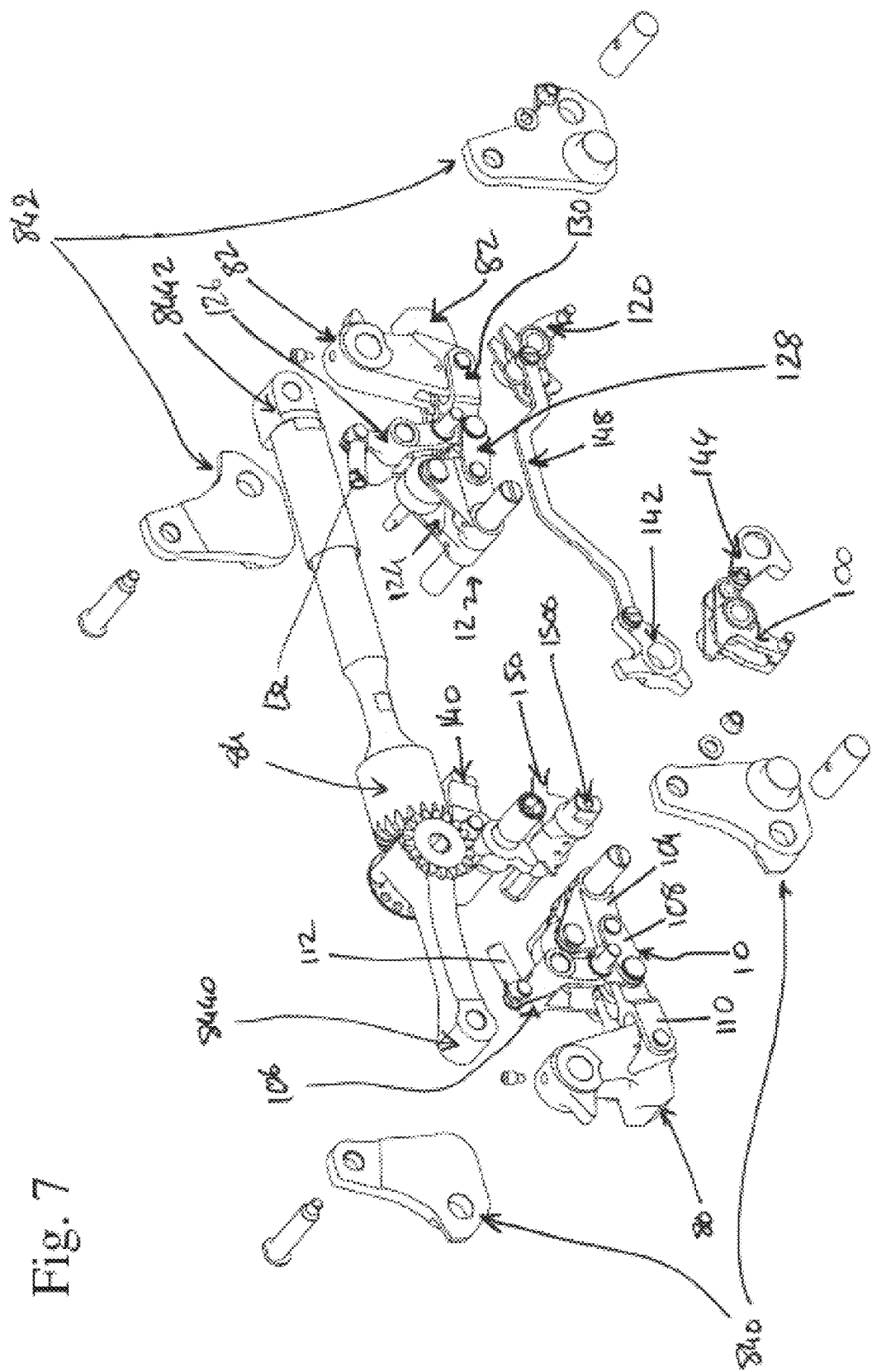
FIG. 7 is an exploded view of the kinematic assembly of FIG. 6B.

The unlocking assembly 14 is able to move the first toggle 10 and the second toggle 12 by means of the first cam 100 and the second cam 120, see in particular FIGS. 6A and 6B. This mainly enables the unlocking assembly 14 to make the first toggle 10 and the second toggle 12 leave their unlocking positions. The unlocking assembly 14 is driven by the projecting thrust of the unlocking piston 66.

The unlocking assembly 14 is disposed between the first toggle 10 and the unlocking piston 66. The unlocking assembly 14 comprises a third cam 140, a fourth cam 142 and a fifth cam 144. The third cam 140, the fourth cam 142 and the fifth cam 144 are rotatably mounted in the direction Y in the frame 4, about an axis 146. The fourth cam 142 is here disposed between the third cam 140 and the fifth cam 144, in the direction Y.

The unlocking assembly 14 is disposed in proximity to the unlocking piston 66. The third cam 140 is disposed opposite the unlocking piston 66. The third cam 140 is in abutment against the head of the unlocking piston 66. The unlocking piston 66, when pushed by the activation of a cartridge, actuates the third cam 140 in a first rotation direction. The third cam 140 thus pushed drives the first cam 100 and the fourth cam 142. The first rotation direction of the third cam 140 is identical to the first rotation direction of the first cam 100. Said first rotation direction of the third cam 140 is here anticlockwise when the ejector 1 is seen from the right.

The third cam 140 rotates the fourth cam 142. When the third cam 140 pivots in a direction (clockwise or anticlockwise), the fourth cam 142 pivots in this same direction.

The third cam 140 comprises a finger 1400 projecting towards the right in the direction Y. The fourth cam 142 comprises a bracket 1420 forming a radial projection. The finger 1400 is engaged against the bracket 1420. The finger 1400 and the bracket 1420 perform the rotational driving of the fourth cam 142 by the third cam 140. Here the bracket 1420 is substantially wider than the finger 1400, this confers a certain clearance on the rotational driving between the third cam 140 and the fourth cam 142.

In a variant, the rotational coupling between the third cam 140 and the fourth cam 142 can be performed by a bracket on the third cam 140 and a finger on the fourth cam 142.

The third cam 140 and the first cam 100 are in abutment one against the other. The third cam 140, when it pivots in its first rotation direction (here anticlockwise), drives by contact the first cam 100 in its second rotation direction (here clockwise). The first cam 100, when it pivots in its first rotation direction (here anticlockwise), drives by contact the third cam 140 in its first rotation direction (here clockwise).

The fifth cam 144 and the first cam 100 are coupled. The first cam 100 comprises a finger 1000 projecting forwards in the direction Y. The fifth cam 144 here comprises an oblong hole 1440. The oblong hole 1440 here extends approximately radially with respect to the axis 146. The finger 1000 is engaged in the oblong hole 1440. The finger 1000 and the oblong hole 1440 are coupled, whereby the fifth cam 144 is in engagement with the first cam 100. The fifth cam 144 and the first cam 100 are thus rotationally coupled with a clearance.

The unlocking assembly 14 comprises a longitudinally rigid member 148. The second cam 120 and the fourth cam 142 are rotationally coupled by means of the longitudinally rigid member 148. The longitudinally rigid member 148 fulfils the role of a swivel. When the fourth cam 142 pivots in a direction (clockwise or anticlockwise), the second cam 120 pivots in this same direction. The longitudinally rigid member 148 passes alongside and/or above the unlocking piston 66. In a variant it could be imagined that the longitudinally rigid member 148 passes alongside and below the unlocking piston 66. The longitudinally rigid member 148 here comprises a bar articulated at the ends with the fourth cam 142 and the second cam 120.

Thus, when the unlocking piston 66 rotates the third cam 140 in its first direction (here anticlockwise), said third cam 140 rotates the first cam 100 in its second direction (here clockwise) and the second cam 120 in its second direction (here anticlockwise). The rotation directions of the first cam 100 and of the second cam 120 are opposite, which enables the toggles 10 and 12 to move symmetrically with respect to the first plane 44.

The safety member 15 locks the unlocking assembly 14. The safety member 14 comprises a safety lever 150. The safety lever 150 is rotatably mounted on a shaft 1500 eccentric with respect to the axis 146. The safety lever 150 is here disposed below the three cams of the unlocking assembly 14.

The safety lever 150 makes it possible to lock or not the unlocking assembly 14 and the two toggles 10 and 12, in order to control the state of the hook assembly 8. The safety lever 150 comprises an internal blade 1502 (visible in FIG. 4) and an external blade 1504 (visible in FIGS. 2 and 3). The external blade 1504 and the internal blade 1502 are constrained to rotate with the rest of the safety lever 150. The external blade 1504 is accessible from the outside of the frame 4. The external blade 1504 can be manipulated by an operator, in particular in order to turn said safety lever 150 manually, typically on the ground.

In one embodiment, at least one of the ends 1460 of the axis 146 comprises a female key, for example of the hexagonal type. When the safety lever 150 is in the ARMED or GRD position, the external blade 1504 leaves the access to said end 1460 by an operator free. This makes it possible to move the cams of the locking member 14 manually between the locking and unlocking positions. Said movement can be made by means of a male key complementary to the female key, for example during a routine check. When the safety lever 150 is in the SAFE position, the external blade 1504 obstructs the access to said end 1460 of the locking member 14. This prevents damaging all the kinematics by forcing the manual movement of the cams of the locking member 14 whereas the safety lever 150 is in the SAFE position. The ergonomics and the durability of the ejector 1 are improved. The internal blade 1502 may optionally be coupled to one or more position sensors in order to indicate electrically the position of the safety lever 150.

In one embodiment, the internal blade 1502 acts on the firing line of the ejector 1, that is to say an electrical circuit activating the separation of the device 2 on reception of a separation command. When the safety lever 150 is in the GRD or SAFE position, the internal blade 1502 opens the firing line, preventing the separation command from causing the separation of the device 2. When the safety lever is in the ARMED position, the internal blade 1502 closes the firing line, enabling the separation command to cause the separation of the device 2. The internal blade 1502 thus provides an electrical safety device for the ejector 1, in addition to the mechanical safety device that the unlocking assembly 14 and the safety lever 150 provide.

The safety lever 150 may furthermore be pivoted automatically by an electromechanical unit (not shown in the figures), typically in flight. The electromechanical unit may be controlled during a mission by an operator, for example the pilot of an airplane, of a helicopter or of a drone.

In the embodiment described here, the hook assembly 8 further comprises a lifting member 84. The two hooks 80 and 82 are rotatably mounted in the direction Y on the lifting member 84. The lifting member 84 supports and raises the hooks 80 and 82. When the hooks 80 and 82 hold the device 2, the lifting member 84 presses the device 2 against the lugs 402. The ejector 1 holds the device 2 in a very stable fashion. This enables the ejector 1 to support very heavy loads in a small space.

The lifting member 84 comprises a first lever 840, a second lever 842 and a clamping assembly 844. The first lever 840 and the second lever 842 are rotatably mounted on the frame in the direction Y.

The clamping assembly 844 is a mechanism extending longitudinally between two end portions 8440 and 8442 in the direction X. The clamping assembly 844 is able to extend or shorten, that is to say to bring its two end portions 8440 and 8442 further apart or closer together.

The first lever 840 and the second lever 842 are here in a roughly L or V shape. A first respective end of the first lever 840, or respectively of the second lever 842, is connected to the first end portion 8440, or respectively the second end portion 8442, of the clamping assembly 844. The respective second end of the first lever 840, or respectively of the second lever 842, rotationally supports the first hook 80, or respectively the second hook 82.

Thus, when the clamping assembly 844 extends, or respectively shortens, the first hook 80 and the second hook 82 rise, or respectively descend.

The clamping assembly 844 here comprises two rods 8444 and 8446 in line with each other, between which a gear set 8448 is disposed. The gear set 8448 here comprises a first toothed wheel 8450 rotatably mounted in the direction Y and a second toothed wheel 8452 rotatably mounted in the direction X.

Figure 8:
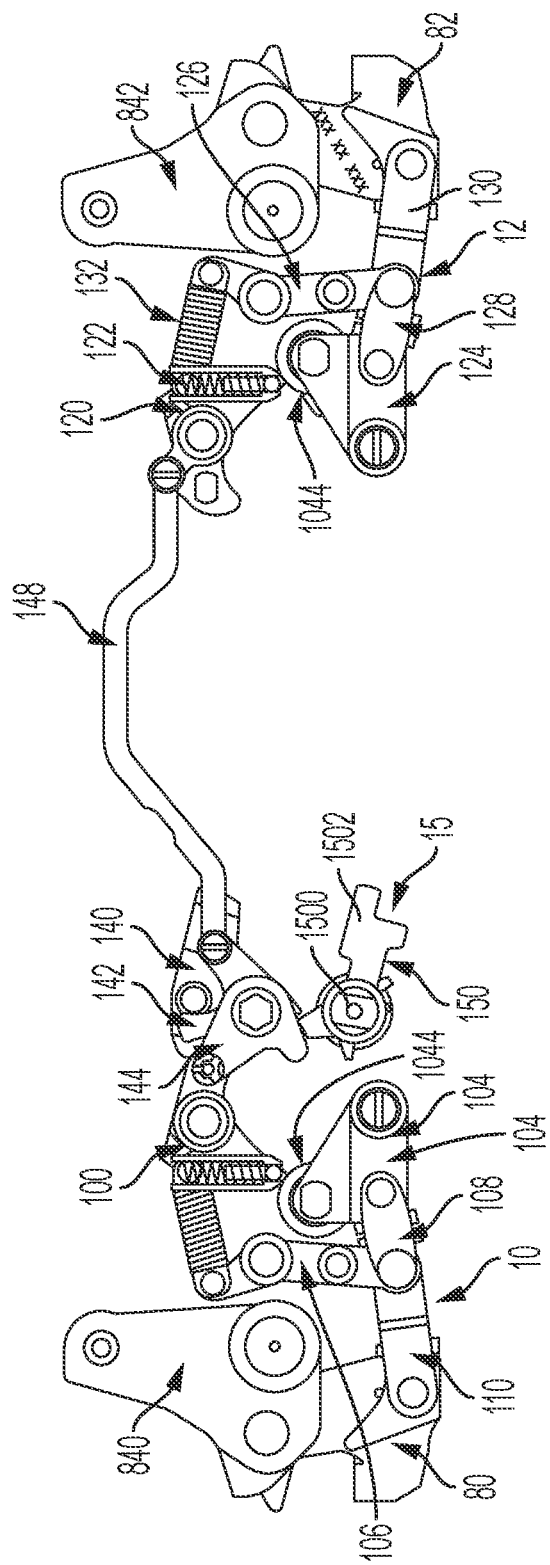
FIG. 8 is a detail view of FIG. 5, a safety lever of the ejector being in a first position.
Figure 9:
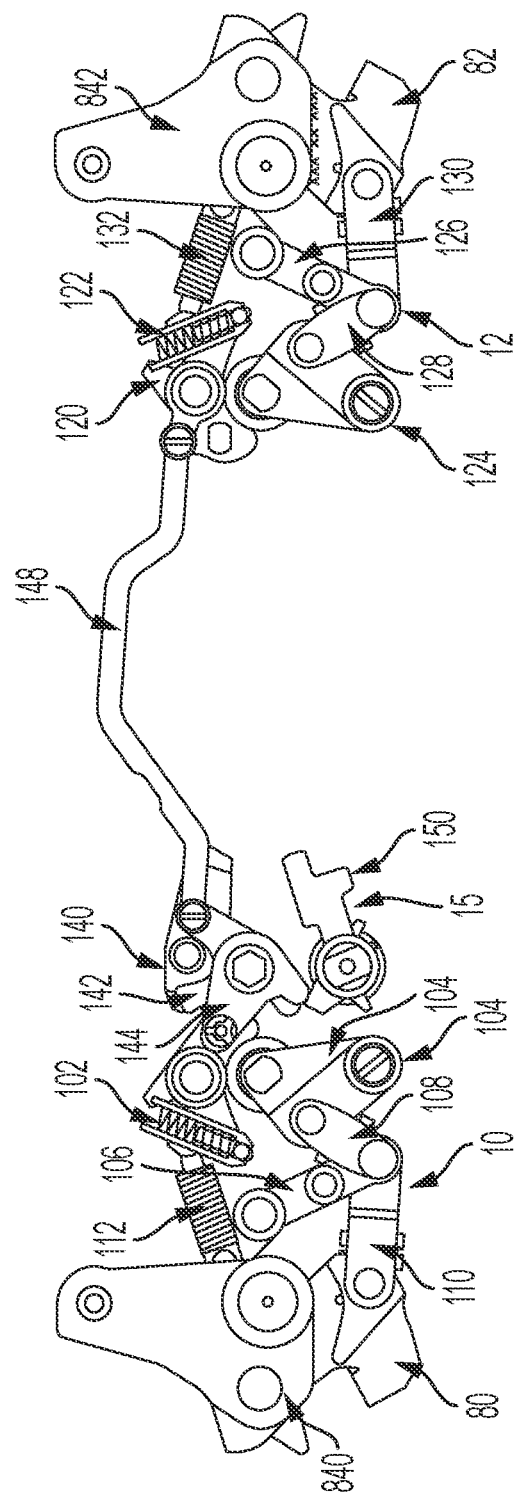
FIG. 9 is a view of the safety lever of FIG. 8 in a second position.
Figure 10:
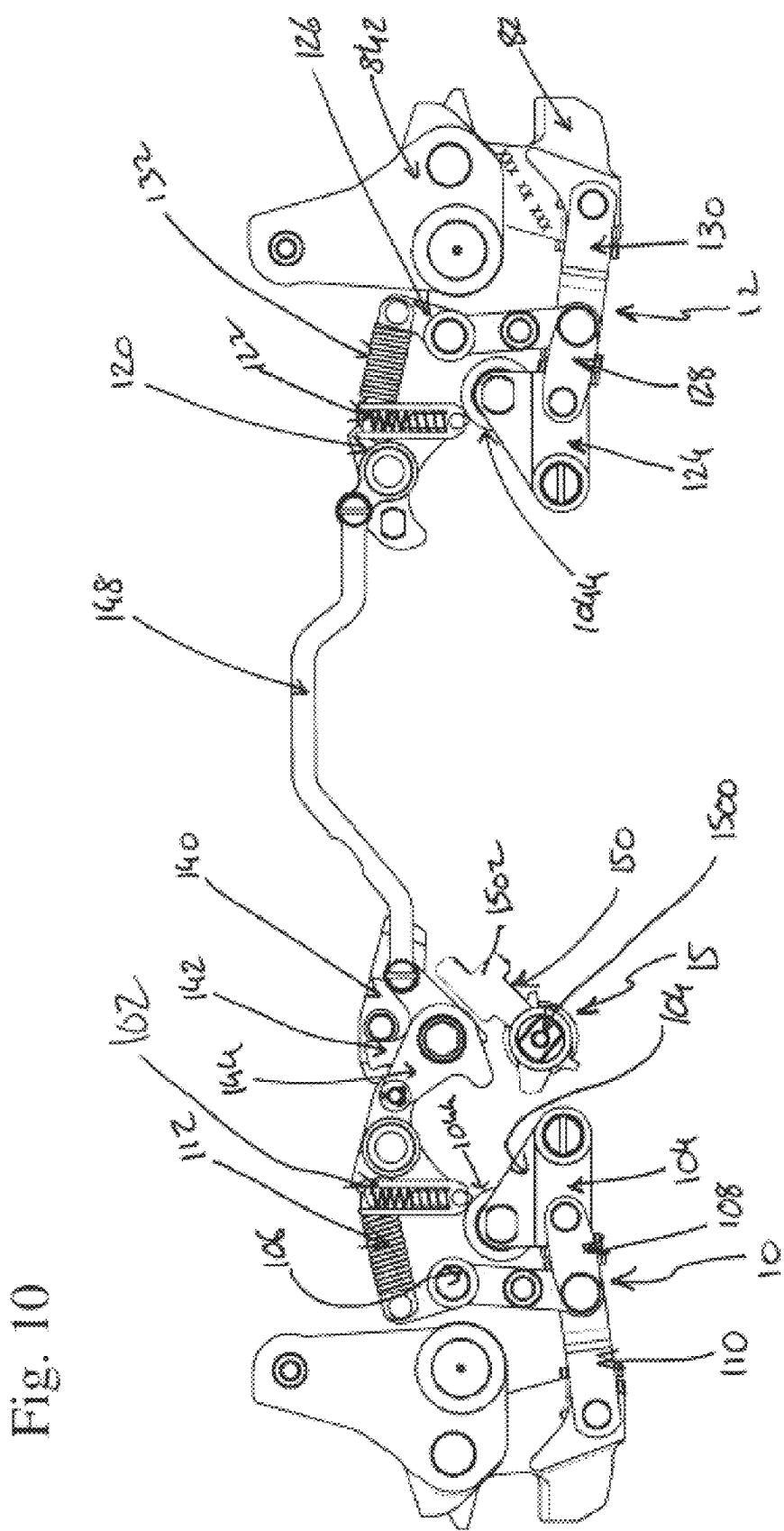
FIG. 10 is a view of the safety lever of FIG. 8 in a third position.

Reference is made to FIGS. 8 to 10.

Figure 2:
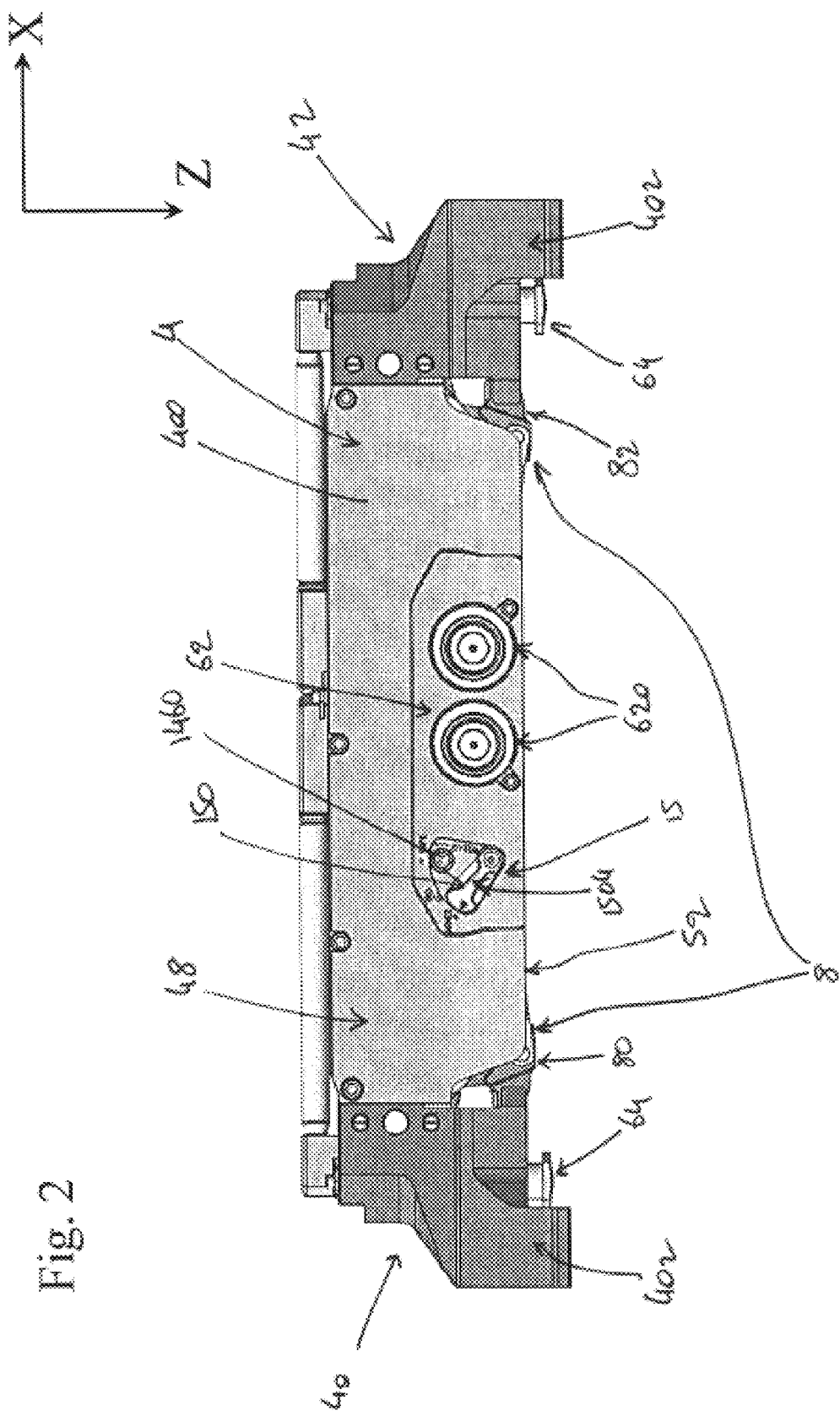
FIG. 2 is a right-hand view of the ejector of FIG. 1.
Figure 3:
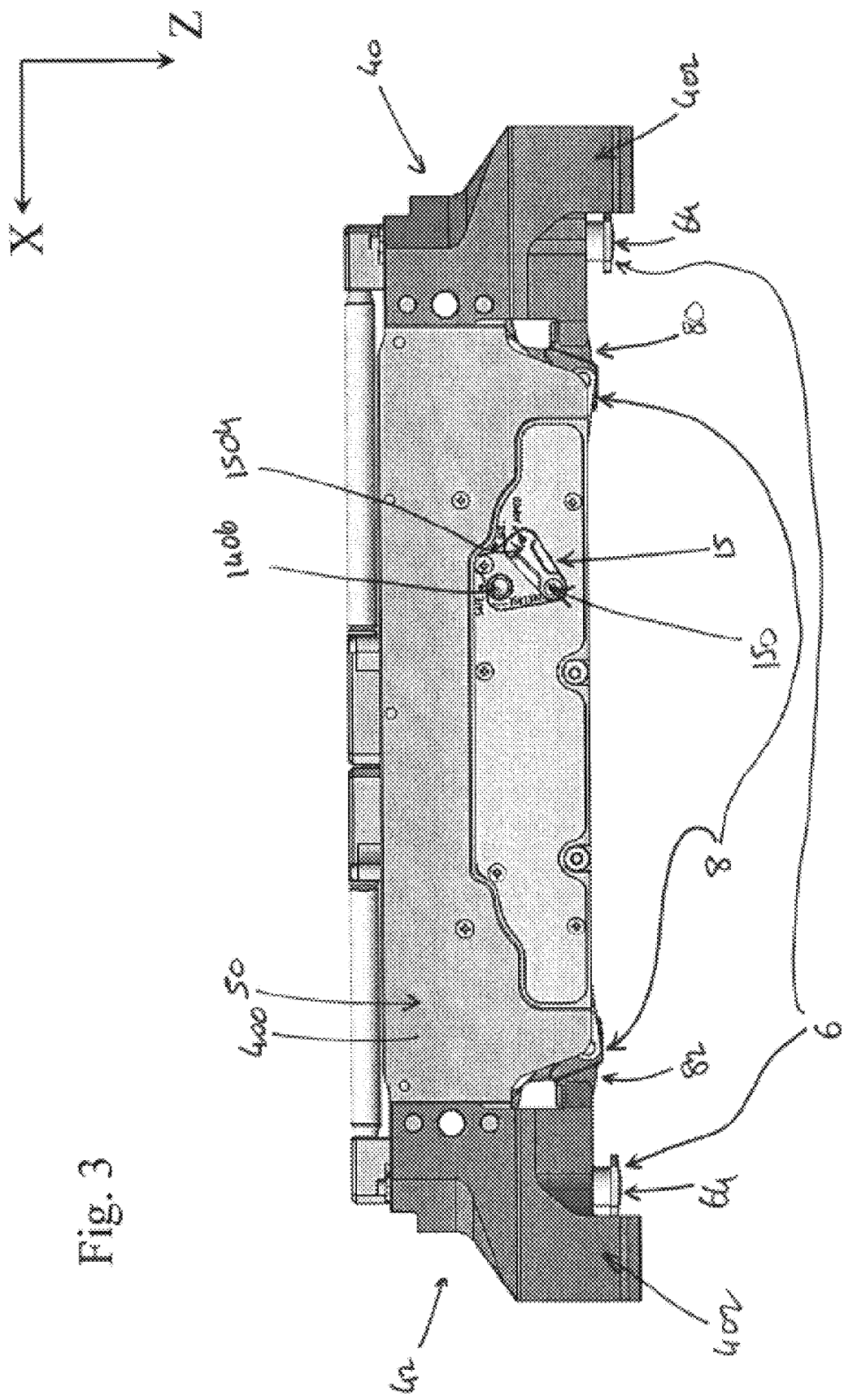
FIG. 3 is a left-hand view of the ejector of FIG. 1.
Figure 4:
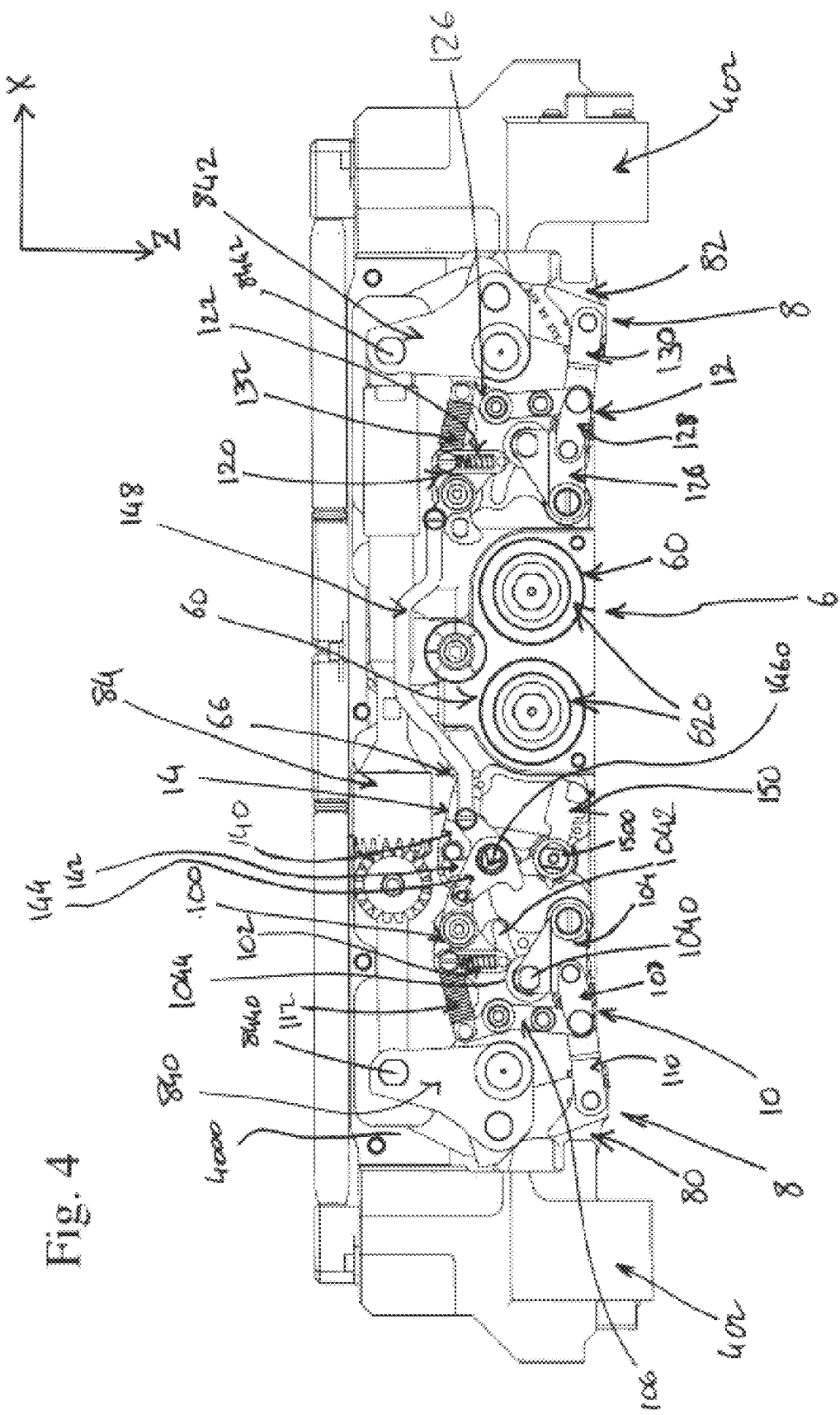
FIG. 4 is a view of the inside of the ejector of FIG. 2.
Figure 5:
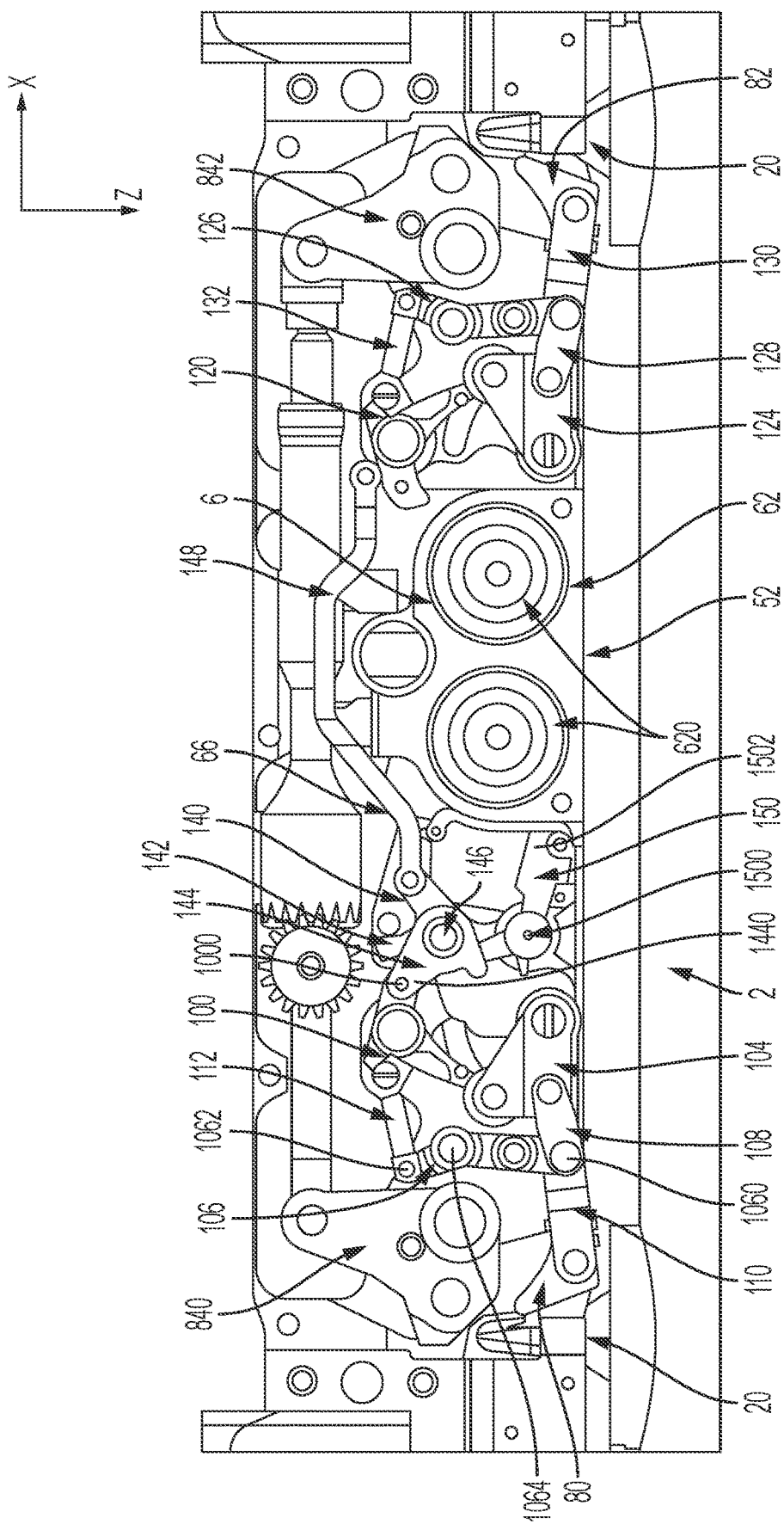
FIG. 5 is a view of the ejector of FIG. 4 loaded with a device.

The safety lever 150 has a first position (FIG. 8), a second position (FIG. 9) and a third position (FIG. 10), indicated respectively by the inscriptions SAFE, GRD and ARMED in FIGS. 1 to 3.

In the first SAFE position, also referred to as the safety position, the safety lever 150 rotationally blocks the third, fourth and fifth cams 140, 142, 144 in the unlocking direction. This blocks, in the unlocking direction, the first cam 100 and the second cam 120 in the locking position. The toggles 10 and 20 are blocked in the locking position.

In the second position GRD, the safety lever 150 is blocked by the fourth and/or fifth cam 144 at a distance from the return SAFE position.

In the third ARMED position, the safety lever 150 leaves the third, fourth and fifth cams 140, 142 and 144 free to rotate.

FIGS. 11 to 15 are views of the ejector 1 during the loading of a device 2.

The loading comprises the reception of a device 2 by the ejector 1 and the securing of said device 2 by the hook assembly 8. The loading of the device 2 is in general carried out on the ground. During the loading, the device 2 is mounted at the ejector 1 by a lifting apparatus (not shown in the figures).

Figure 11:
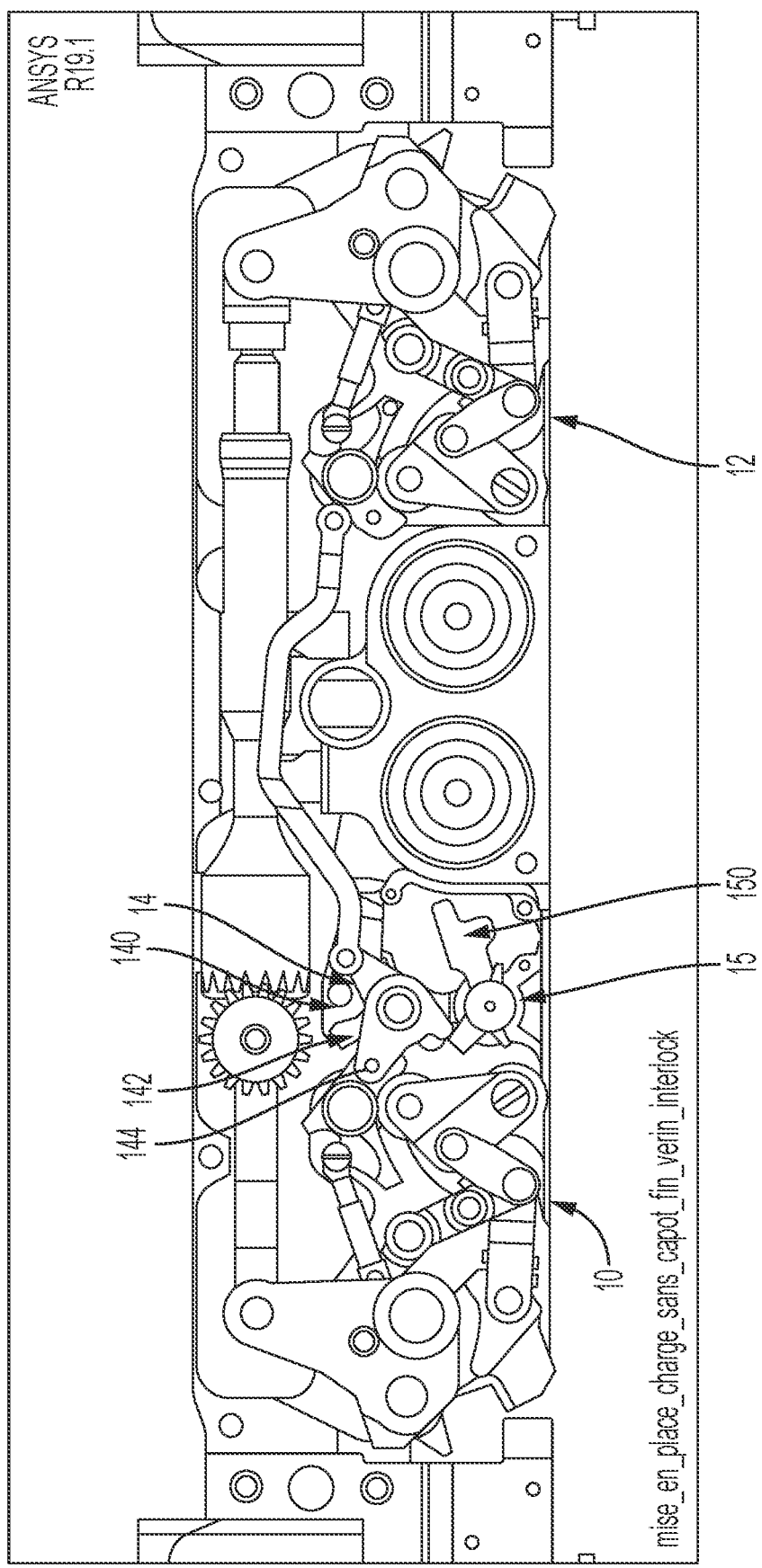
FIG. 11 is a view of the inside of the ejector of FIG. 4 before loading.
Figure 12:
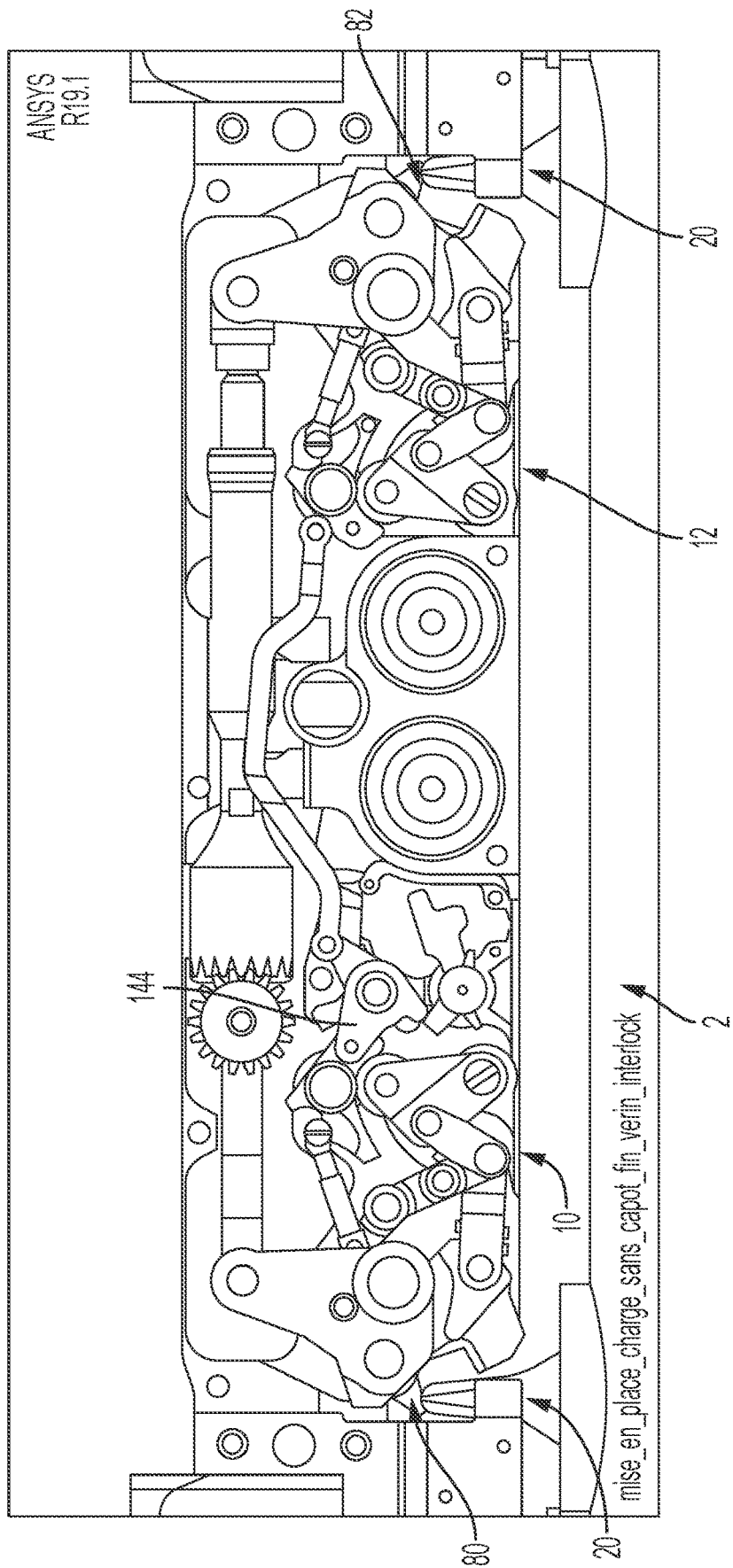
FIG. 12 is a view of the ejector of FIG. 8 during a loading, in a first phase, the toggles and the hooks not being locked.

The loading comprises the following steps:

A1) The hooks being in the low position, the safety lever 150 is in the GRD position before the ejector 2 receives a device 2 (FIG. 11). The safety member 15 does not lock the unlocking assembly 14. The third, fourth and fifth cams 140, 142 and 144 are in the unlocking position. The toggles 10 and 12 are in their respective unlocking positions.

Figure 13:
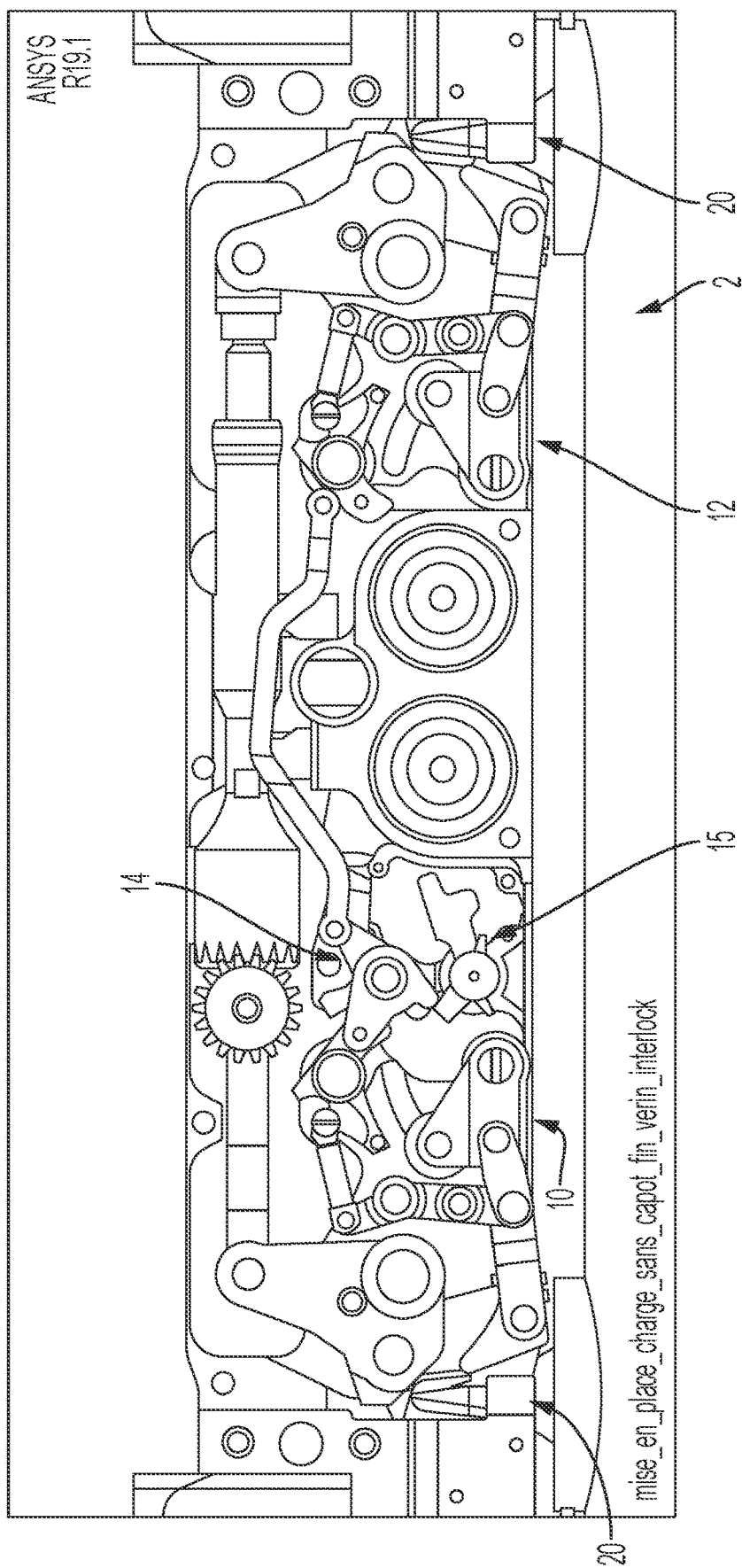
FIG. 13 is a view of the ejector of FIG. 8 during a loading, in a second phase, the hooks being locked and the cams not yet being locked.

A2) When the ejector 1 receives a device 2 (FIG. 12) mounted by the lifting apparatus, the holding projections 20 of the device 2 bear upwards against the hooks 80 and 82. The lifting of the device 2 moves the hooks 80 and 82 upwards, whereby the hooks 80 and 82 close. The closure of the hooks 80 and 82 and the fifth cam 144 cause the tilting of the toggles 10 and 12 into the locking position (FIG. 13).

Figure 14:
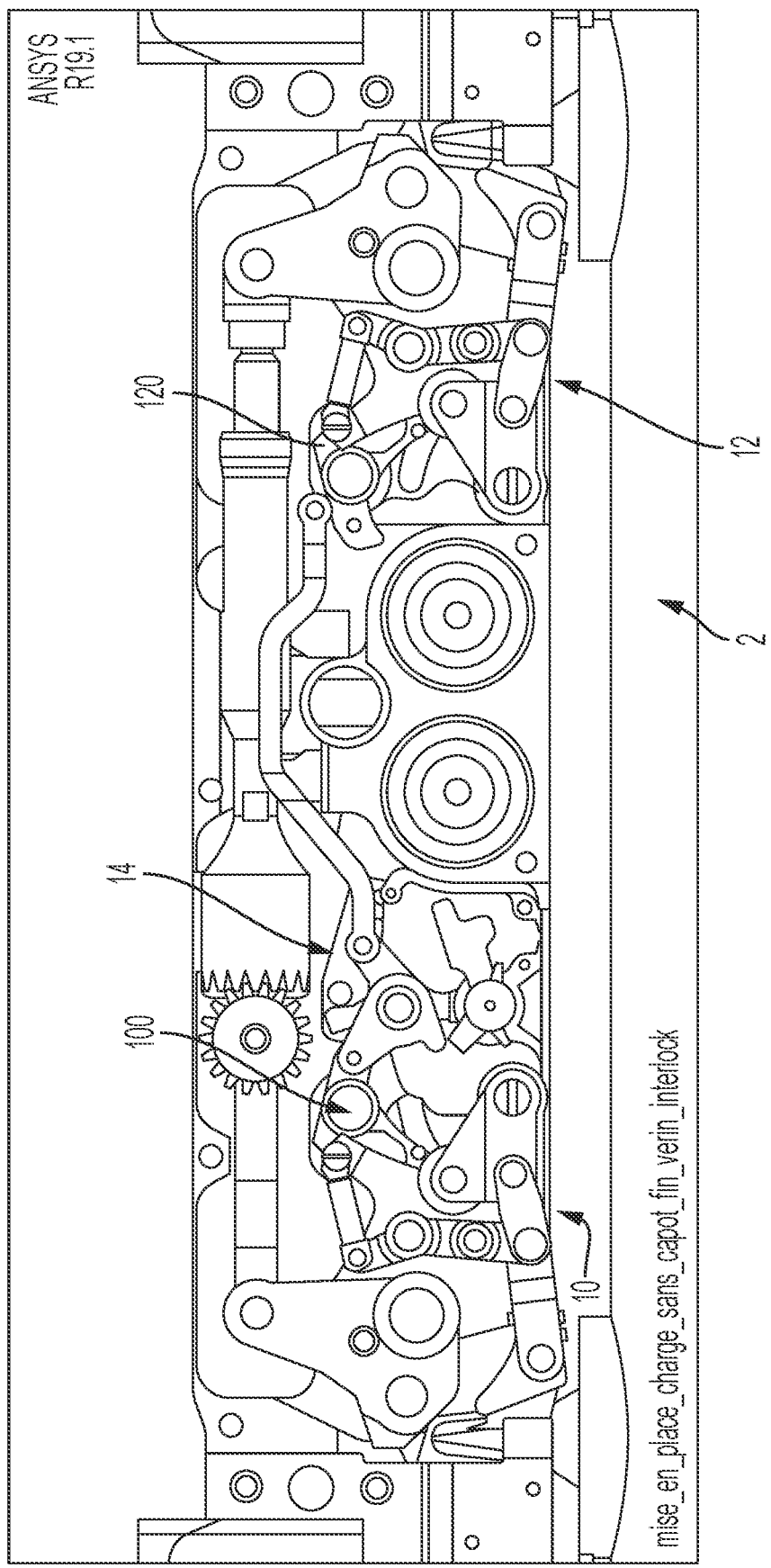
FIG. 14 is a view of the ejector of FIG. 8 during a loading, in a third phase, the toggles and the hooks being locked, the safety lever not yet being in the safety position.
Figure 15:
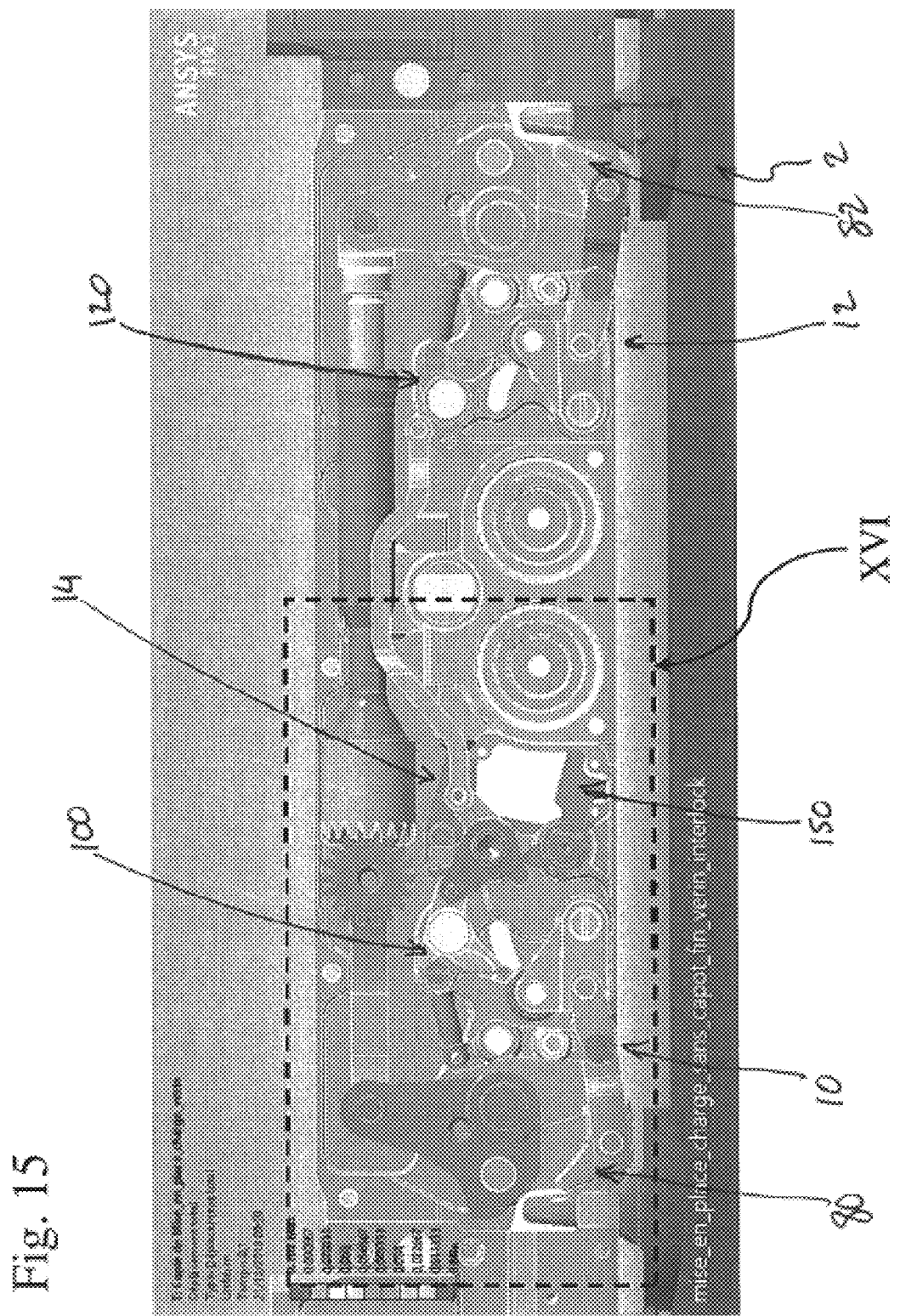
FIG. 15 is a view of the ejector of FIG. 8 during a loading, in a fourth phase.

A3) The lifting apparatus releases the device 2, which descends slightly. The first cam 100 and the second cam 120 tilt into the locking position (FIG. 14). The toggles 11 and 12 are locked in the locking position.

A4) After reception of the device 2, the safety lever 150 tilts from the GRD position to the SAFE position (FIG. 15), which blocks the first cam 100 and the second cam 120 in the locking position. The toggles 10 and 12 are also blocked in the locking position. The hooks 80 and 82 are kept closed. The unlocking piston 66 cannot open the hooks 80 and 82 and cause release of the device 2.

In the embodiment described here, the loading of the ejector 1 further comprises the following optional step:

A5) The lifting assembly 86 raises the hooks 80 and 82. The device 2 is secured by the ejector 1.

FIGS. 16 to 20 are views of the ejector 1 during an ejection.

The ejection comprises the release of the device 2 by the hook assembly 8, and then the expulsion of the device 2 by the ejection assembly 6. The ejection is carried out in flight (preferably).

Figure 16:
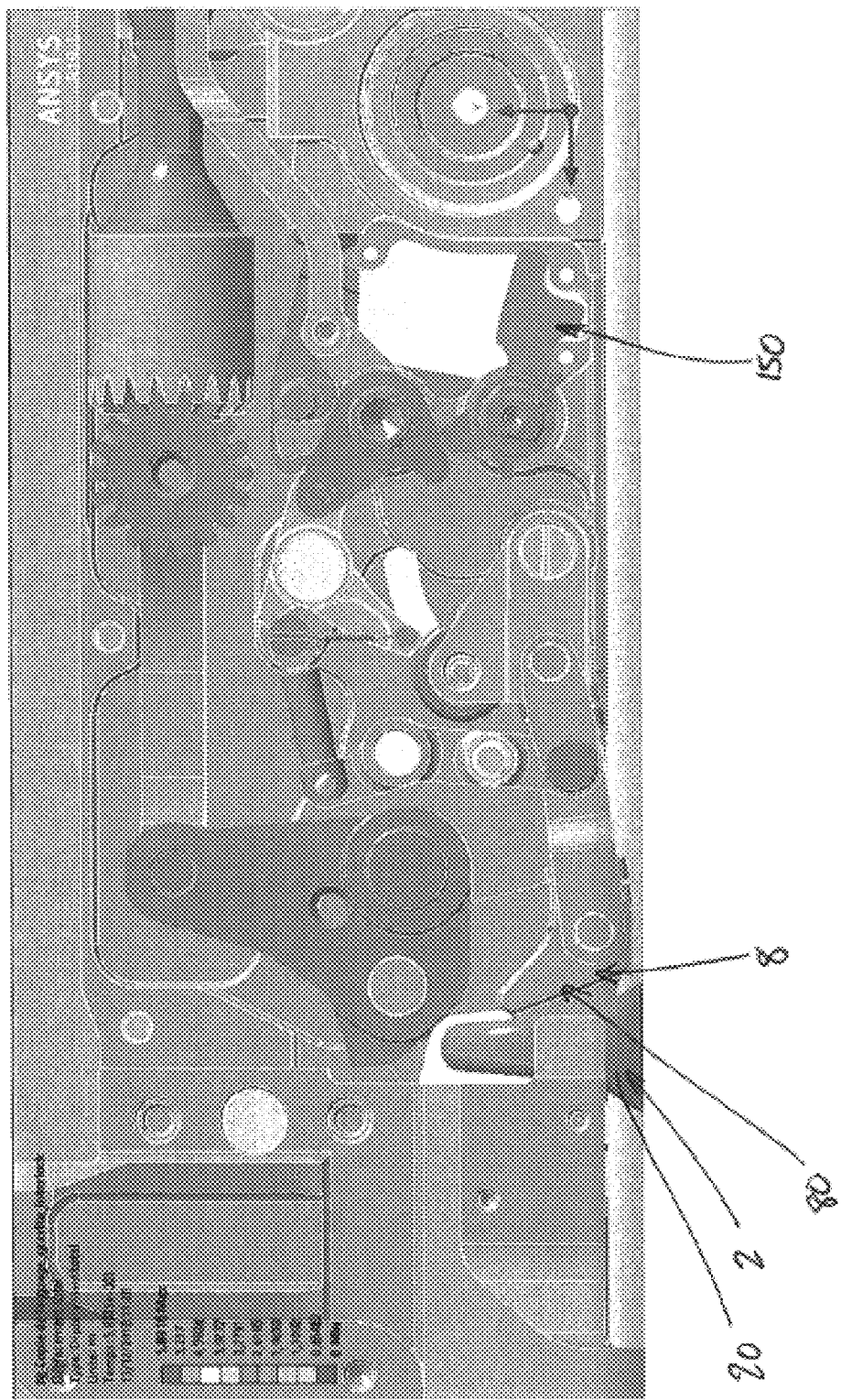
FIG. 16 is a detail view of the ejector of FIG. 5.

The ejection comprises the following steps:

B1) The safety lever 150 is initially in the SAFE position (FIG. 16). The hook assembly 8 secures the device 2.

Figure 17:
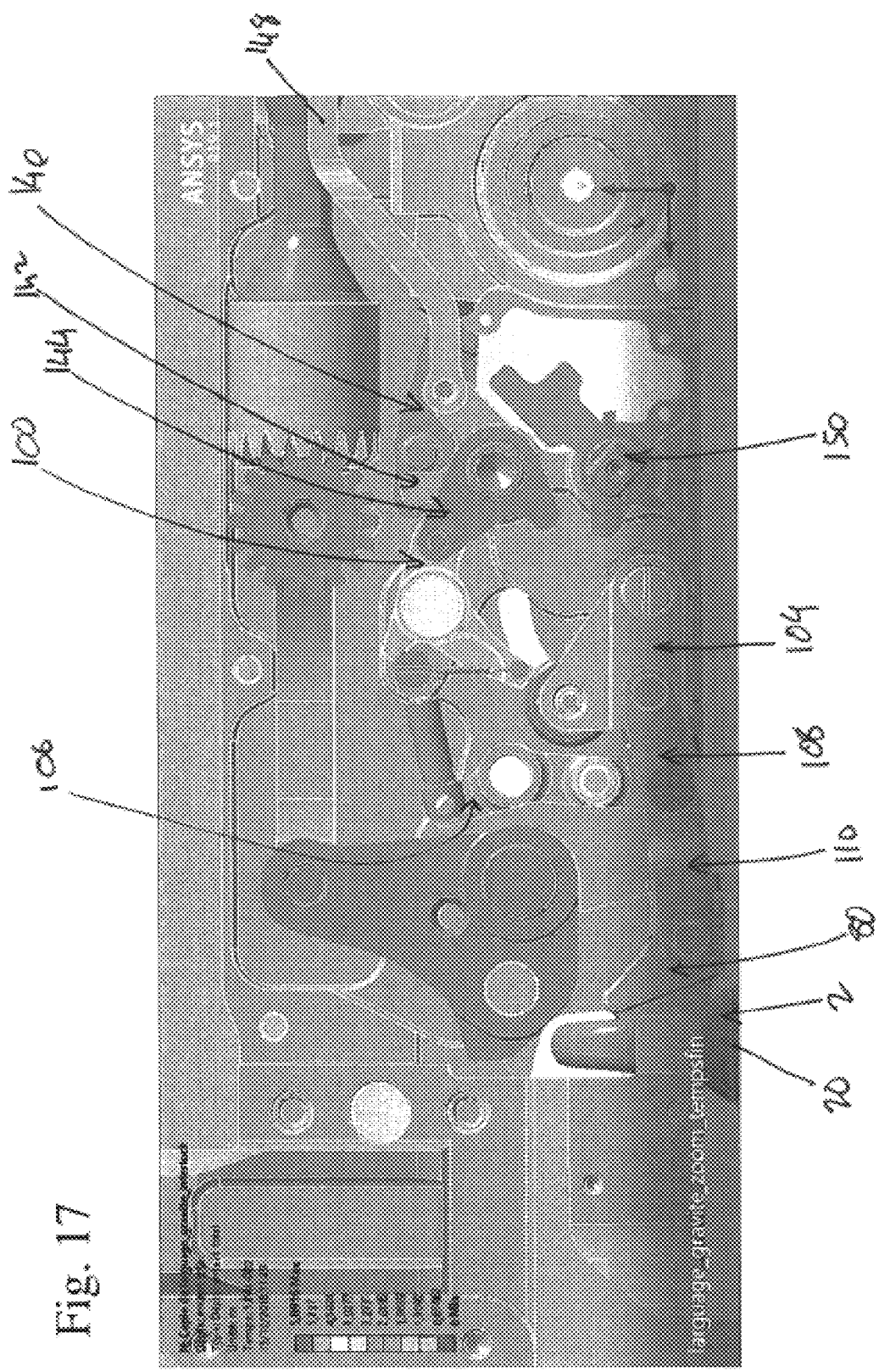
FIG. 17 is a view of the ejector of FIG. 13 during an unlocking, in a first phase, the toggles and the hooks being locked.

B2) When the decision to eject the device 2 is taken, a separation command is sent, typically from the aircraft. The separation command causes the safety lever 150 to tilt from the SAFE position to the ARMED position (FIG. 17). The fifth cam 144 leaves the first cam 100 and the third cam 140 free to rotate. The ejector 1 can release and then eject the device 2 by activating the cartridges.

Figure 18:
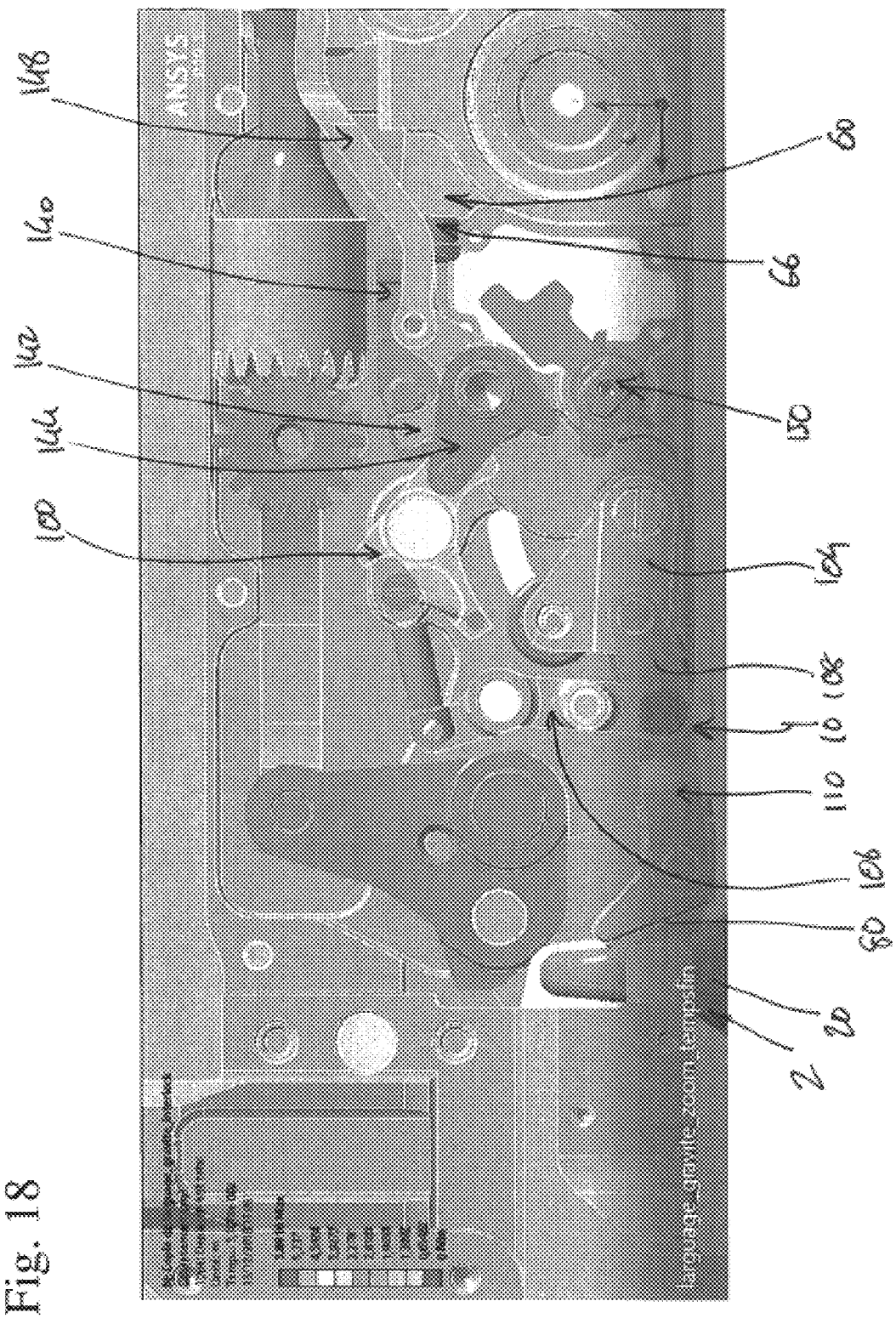
FIG. 18 is a view of the ejector of FIG. 13 during an unlocking, in a second phase.

B3) On activation of the cartridges, the unlocking piston 66 is pushed so as to project out of the body 60. The unlocking piston 66 pivots the third cam 140 in the anticlockwise direction, into the unlocking position. The third cam 140 drives the fourth cam 142 and the fifth cam 144 towards their unlocking position. The third cam 140 also rotates the first cam 100 and the second cam 120 (by means of the fourth cam 142 and the longitudinally rigid member 148) out of their locking positions (FIG. 18).

Figure 19:
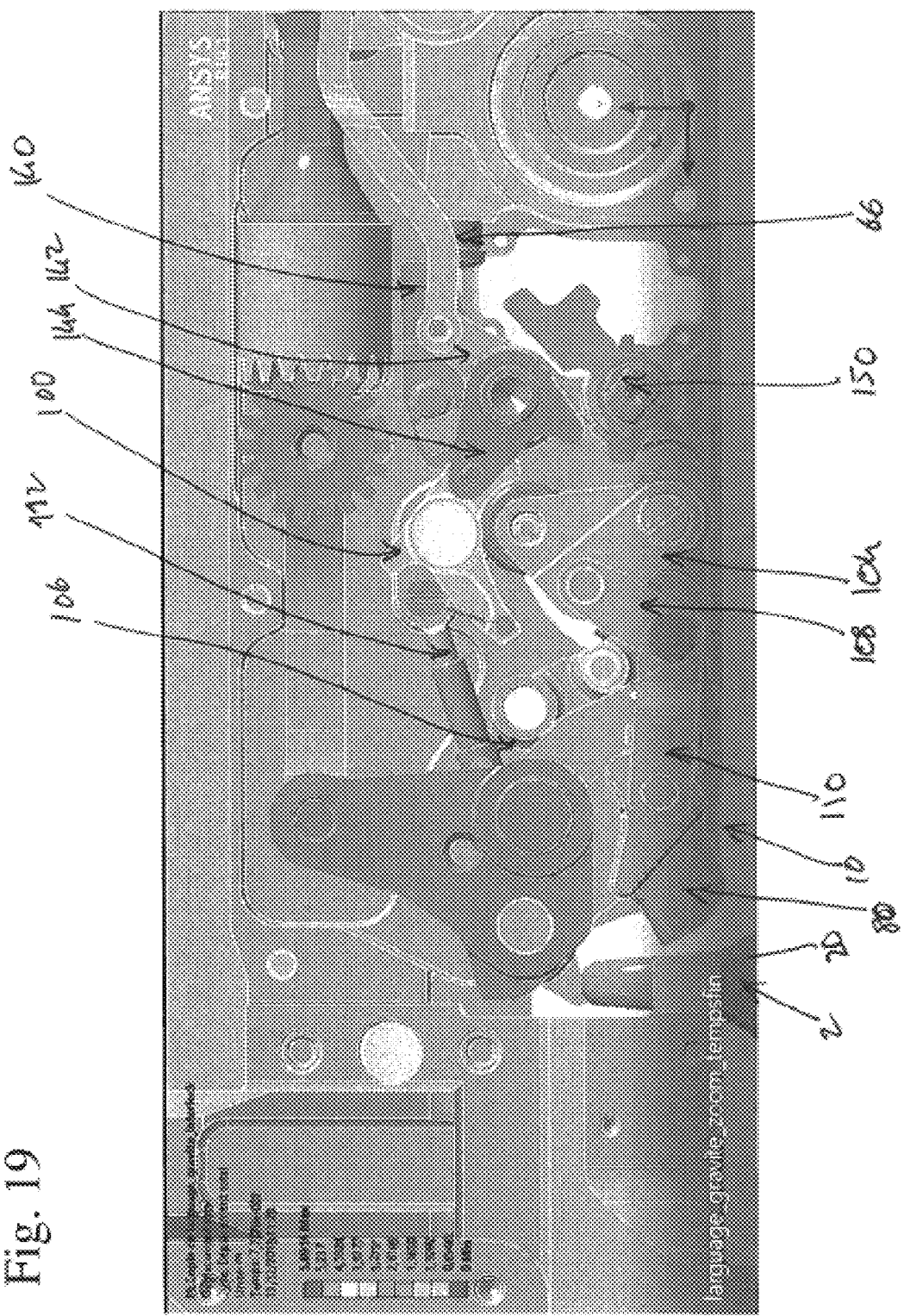
FIG. 19 is a view of the ejector of FIG. 13 during an unlocking, in a third phase.

B4) The rotation of the first cam 100 and of the second cam 120 releases the rotation of the second levers 106, 126. The return springs 112, 132 drive the two levers 106, 126 towards their unlocking positions. The two toggles 10 and 12 tilt from their locking positions to their unlocking positions. The hooks 80 and 82 are unlocked and open (FIG. 19). The hook assembly 8 releases the device 2. The ejection pistons 64 push the device 2 downwards.

Figure 20:
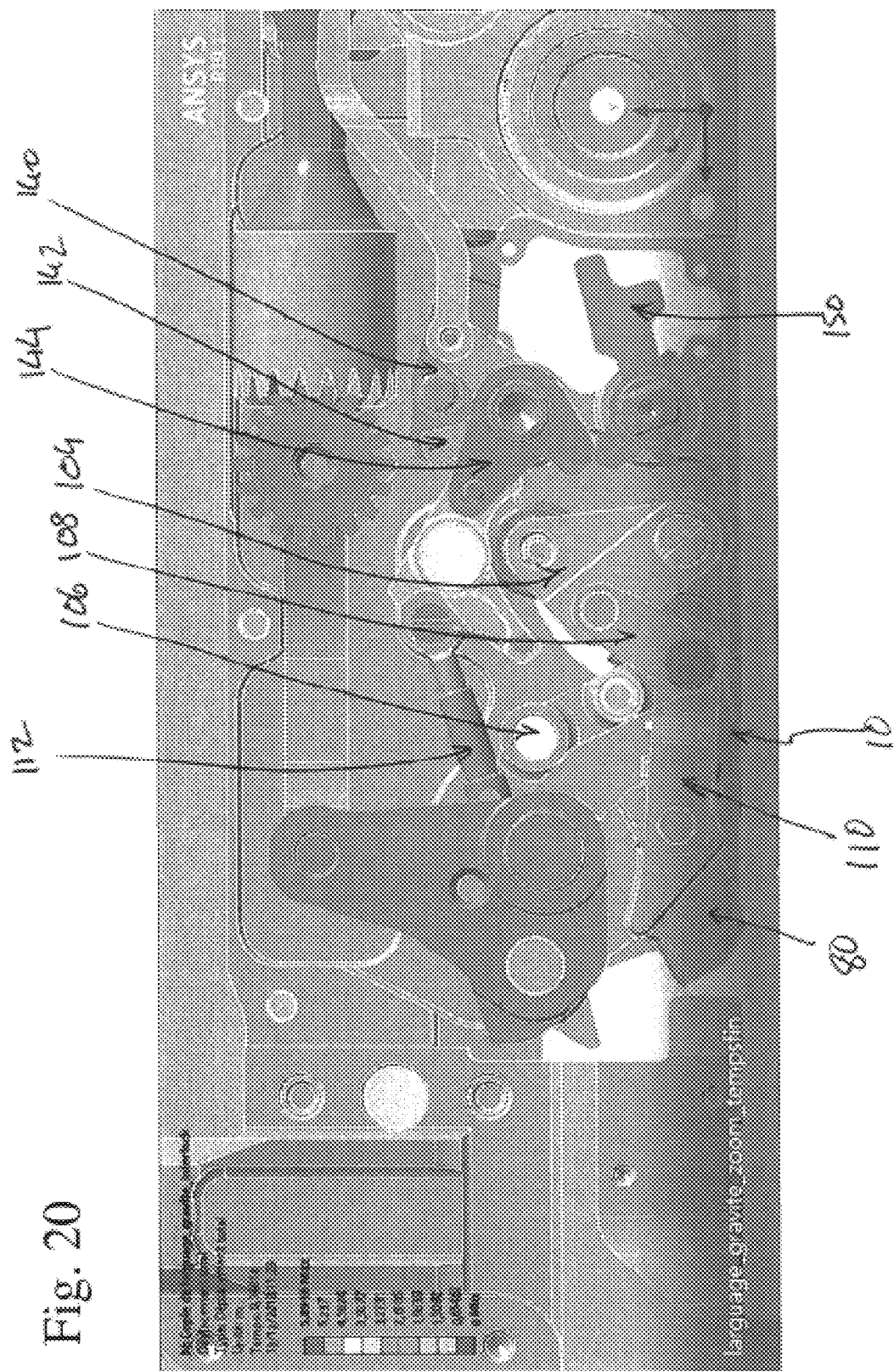
FIG. 20 is a view of the ejector of FIG. 14 after release.

B5) After the ejection of the device 2, the safety lever 150 automatically tilts from the ARMED position to the GRD position (FIG. 20). The safety lever 150 in the GRD position is kept at a distance from the SAFE position by the fourth and/or the fifth cam 142, 144. The safety lever 150 is incapable of locking the unlocking assembly 14 until a new device 2 is locked by the ejector 1.

Thus the safety lever 150 in the SAFE position causes the locking assembly to be secured, including the locking of the hooks 80 and 82. After a release, the safety lever 150 is maintained at a distance from this SAFE position. The safety lever 150 thus replaces the safety pin of the conventional ejectors.

The safety lever 150 can be controlled by the electromechanical unit. This in particular enables the lever to be controlled by the electromechanical unit during a flight. This furthermore saves on the intervention of a human operator. In addition, the safety lever 150 can be maintained in the SAFE position during the flight until the moment when a decision to release the device 2 is taken. The safety of the ejector 1 is greatly improved since the ejector 1 can remain locked and secured (lever in the SAFE position) until the last moment before a release. This is of course more secure than in the known ejectors where the safety pin is removed before the flight (which would correspond to putting the safety lever 150 in the ARMED position during flight).

The safety lever 150 is not removable, unlike the safety pin of the known ejectors. There is no longer any risk of forgetting a safety pin. The safety of the ejector 1 as a whole is more reliable. The preparation for and the return from missions are simplified. The ergonomics of the ejector 1 is improved.

The invention claimed is:

1. An aeronautical conveying and release device, comprising:
    a frame,
    an actuator releasing a device to be released,
    a hook assembly comprising a first hook and a second hook, able to hold the device to be released,
    a first locking toggle and a second locking toggle substantially similar and disposed symmetrically in the frame between the first and second hooks, each of the first and second toggles having a locking position wherein said first or second toggle locks said first or second hook, and an unlocking position wherein said first or second toggle causes the unlocking of said first or second hook, a first cam and a second cam, each rotatably mounted in the frame and maintained in contact with the first or second toggle in a first direction by an elastic return member, a movement of the first or second cam counter to said elastic member in a second direction opposite to the first direction causing the first or second toggle to leave the locking position and causing the unlocking of the first or second hook, an unlocking assembly, comprising a third cam, a fourth cam and a fifth cam, rotatably mounted in the frame on an axis, wherein the third cam is actuated by the actuator from an idle position, with return to the idle position, the fourth cam is rotated by the third cam in the unblocking direction, and drives the second cam in the unblocking direction by a longitudinally rigid member, the third cam drives the first cam by contact in the unblocking direction, the fifth cam is coupled to the first cam, a safety member comprising a safety lever that can be in a first SAFE position wherein the safety lever rotationally blocks the third, fourth and fifth cams in the unblocking direction, whereby the first cam and the second cam are rotationally blocked in the unlocking direction, thereby blocking the first toggle and the second toggle in the locking position, a second GRD position wherein the safety lever is rotationally blocked by at least one of the fourth and fifth cams at a distance from said SAFE position, and a third ARMED position wherein the safety lever leaves the third, fourth and fifth cams free.

2. The device according to claim 1, wherein the first toggle and the second toggle are disposed on either side of the actuator, the first cam and the second cam are disposed between the first toggle and the second toggle, the unlocking assembly is disposed between the first toggle and said actuator, and the longitudinally rigid member passes alongside or above the actuator.

3. The device according to claim 1, wherein each toggle comprises at least one return member, and a first lever and a second lever, each articulated on the frame, a first swivel, connecting the first lever and the second lever, and a second swivel, connecting the second lever and the hook assembly, the second lever, the first swivel and the second swivel being articulated together about an axis, the first lever being blocked in the locking position by the first or second cam when the safety lever is in its first position, whereby said toggle is blocked in the locking position, the first lever in the unlocking position blocking the first or the second cam in the unlocking position, the second lever being forced by the return member in the unblocking direction of said toggle.

4. The device according to claim 3, wherein the first lever is a toggle lever, the second lever is a relay lever, the first swivel is a toggle swivel and the second swivel is a hook swivel.

5. The device according to claim 3, wherein, for the first and for the second toggle, a rotation of the first or second cam releases the rotation of the first lever, the latter releasing the rotation of the second lever by means of the first swivel, and the return spring rotating the second lever causes the movement of the second swivel towards its unlocking position, which unlocks the first or second hook.

6. The device according to claim 1, further comprising an ejection assembly able to push the released device, the ejection assembly comprising a chamber able to store ejection energy, the ejection energy driving the actuator, whereby the third cam is actuated.

7. The device according to claim 6, wherein the actuator comprises a cylinder fluidically connected to the chamber and an unlocking piston, a gas introduced into the cylinder from the chamber pushing the unlocking piston, which unlocking piston pushes the third cam in the unlocking direction.

8. The device according to claim 7, wherein the chamber receives one of at least one pyrotechnic cartridge able to produce pressurized gas and a compressed gas for pushing the unlocking piston.

9. The device according to claim 6, wherein the ejection assembly comprises at least one ejection piston fluidically connected to the chamber and able to push the device, and the actuator is fluidically closer to the chamber than the at least one ejection piston.

10. The device according to claim 1, wherein the safety lever can be moved manually or by an electromechanical unit activated on command.

\* \* \* \* \*